United States Patent [19]

Sakano

[11] Patent Number: 4,851,920
[45] Date of Patent: Jul. 25, 1989

[54] DIGITAL COPYING APPARATUS

[75] Inventor: Yukio Sakano, Fuchu, Japan

[73] Assignee: Ricoh Company, Ltd., Japan

[21] Appl. No.: 232,602

[22] Filed: Aug. 15, 1988

Related U.S. Application Data

[63] Continuation of Ser. No. 921,060, Oct. 21, 1986, abandoned.

[30] Foreign Application Priority Data

Oct. 31, 1985 [JP]  Japan .................................. 60-245032
Oct. 31, 1985 [JP]  Japan .................................. 60-245033

[51] Int. Cl.$^4$ ................................................ H04N 1/40
[52] U.S. Cl. ...................................... 358/456; 358/298
[58] Field of Search ................. 355/7, 14 C; 358/160, 358/280, 283, 298, 300

[56]           References Cited
         U.S. PATENT DOCUMENTS

| 4,447,830 | 5/1985 | Stoffel | 358/283 |
| 4,547,811 | 10/1985 | Ochi et al. | 358/280 |
| 4,577,235 | 3/1986 | Kannapell et al. | 358/280 |
| 4,663,662 | 5/1987 | Sekizawa et al. | 358/280 X |
| 4,707,745 | 11/1987 | Sakano | 358/283 |

Primary Examiner—Patrick R. Salce
Assistant Examiner—Kristine Peckman
Attorney, Agent, or Firm—Mason, Fenwick & Lawrence

[57] ABSTRACT

A digital copying apparatus comprising a region discriminating circuit for processing electrical signals obtained from an image reading scanner and discriminating whether or not the original image is an intermediate tone image. The signals to be supplied to a printer being controlled depending on a signal from the region discriminating circuit, specifically, signals processed at the intermediate tone being selected if the region discriminating circuit detects the presence of the intermediate tone information, whereas signals subjected to a simple binarization are selected if the discriminating circuit detects the absence of the intermediate tone information.

10 Claims, 20 Drawing Sheets

Fig. 5 (ii)
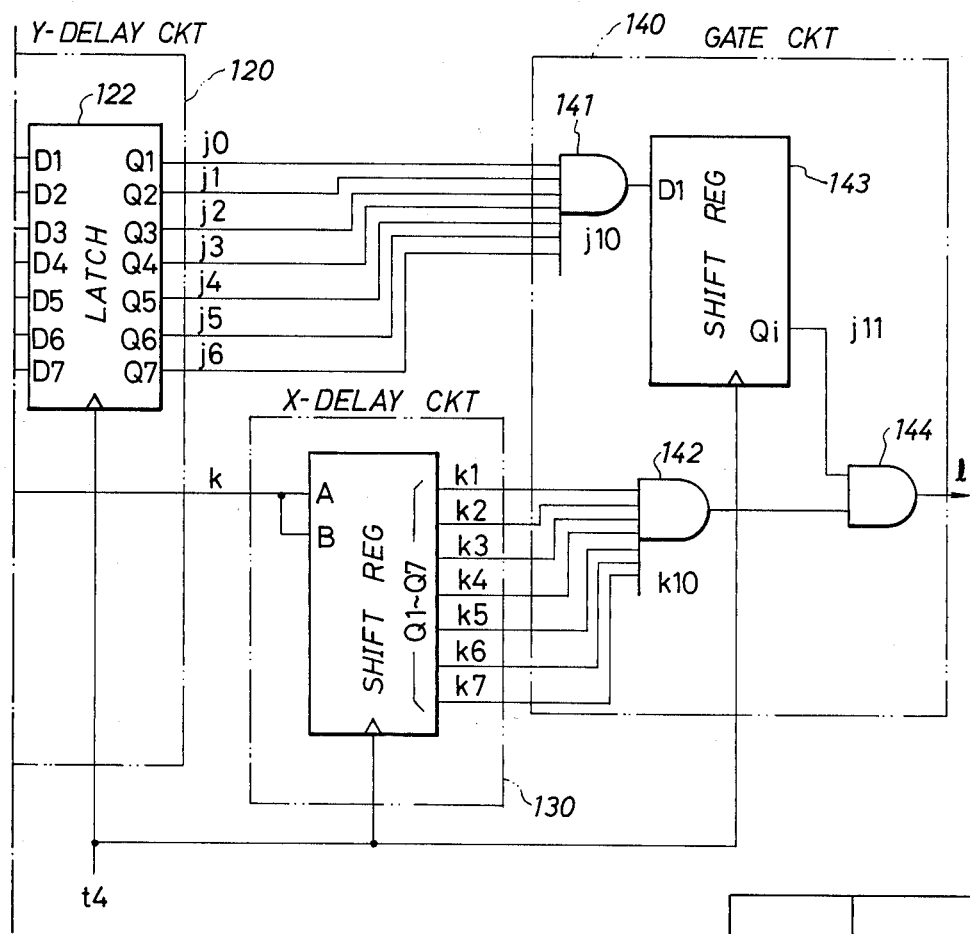

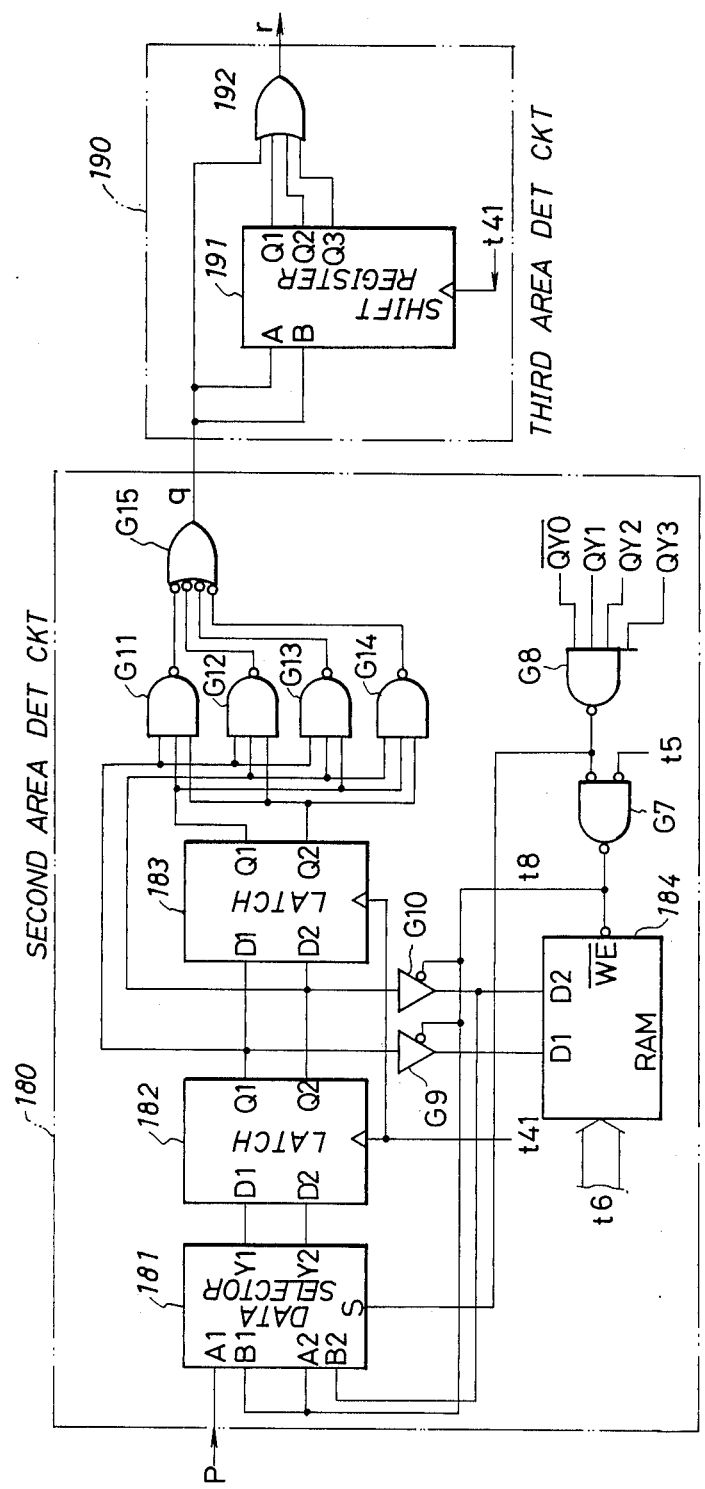

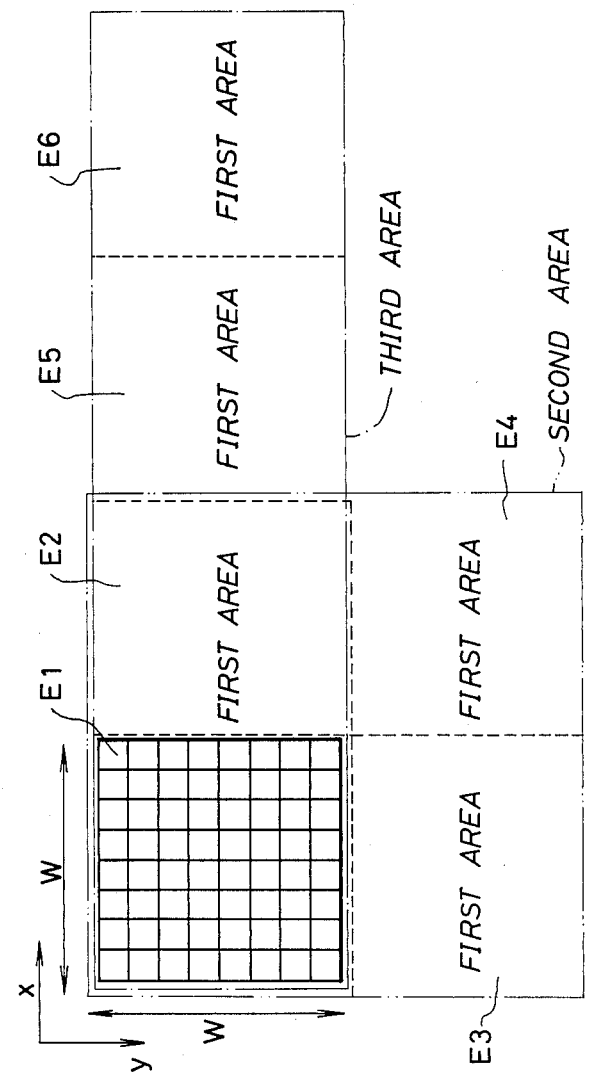

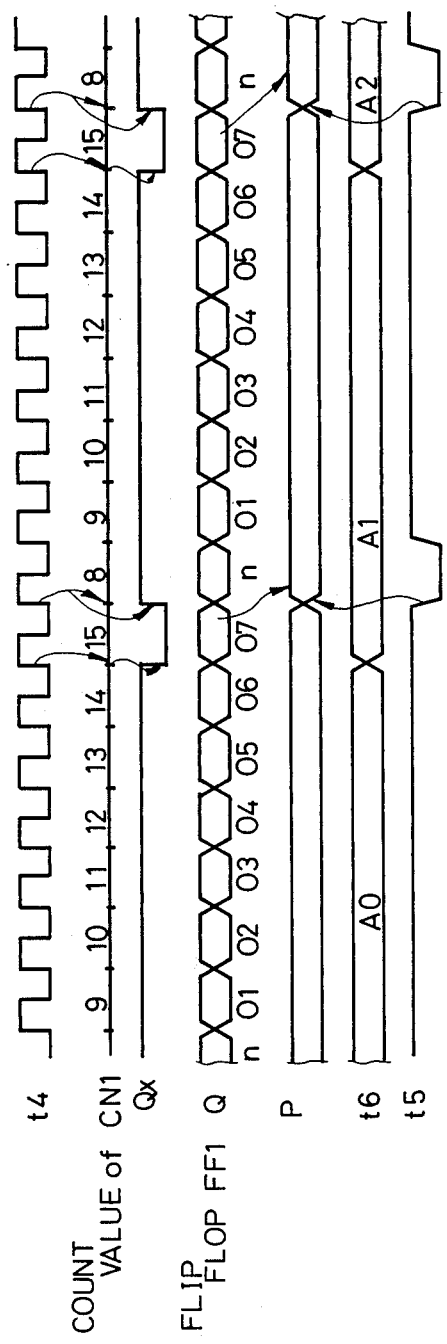

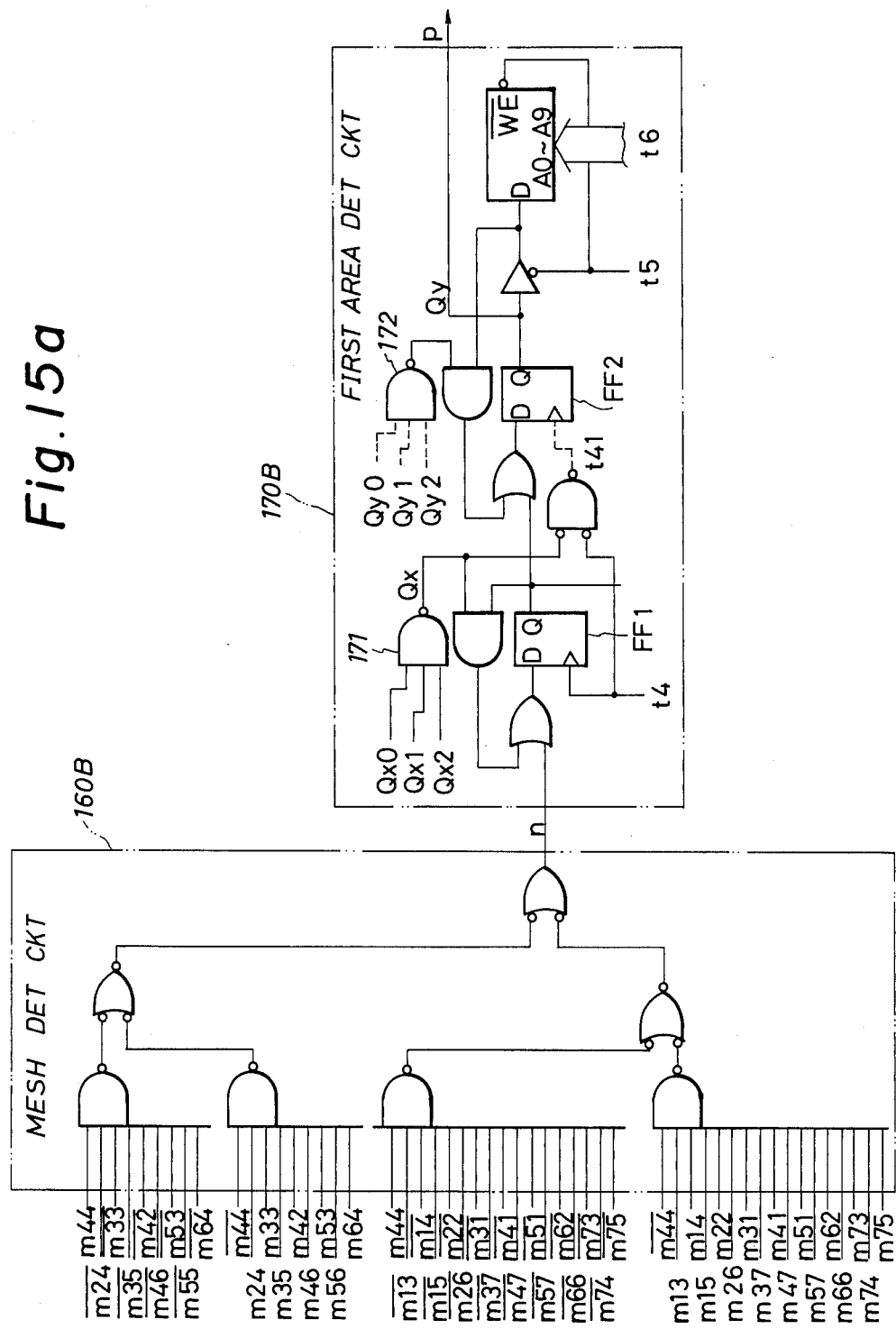

DIGITAL COPYING APPARATUS

This is a continuation of application Ser. No. 921,060, filed Oct. 21, 1986, now abandoned.

BACKGROUND OF THE INVENTION

Field of the Invention

This invention concerns a digital copying apparatus in which an image is read from an original, and converted to electric signals, which are supplied in binary form to a recording device.

In a digital copying apparatus, an image to be copied is generally obtained by reading an image on every minute region of an original, that is, every picture element by using, for example, a CCD (charge-coupled device) image sensor, converting electric analog signals issued at the output of the image sensor into digital signals (analog to digital conversion), applying various kinds of processings to the thus obtained digital signals and then supplying dot signals to a recording device.

By the way, in the recording device used in the copying apparatus of this type, since it is difficult to change the density level on the picture elements to be recorded, the recording of each picture element is generally carried out in binary form. However, since an original document may sometimes include intermediate tone images or half tone images such as in the case of a photograph, it is necessary to reproduce an image with the intermediate tone. For recording the intermediate tone by using a recording device that conducts binary recording, there have been proposed various methods such as dither method, density pattern method and submatrix method. The image with the intermediate tone can be reproduced by using any of these methods.

However, in such a method, while a relatively fine copy is available where the density of the original image changes gradually as in photographic image, contours of the copy image become indistinct making letters unclear. Faint contaminations in the background appear on the copied image to deteriorate the copy quality where a line image (highlight and shadow) is to be processed. This is why a switch is provided in such a machine by which, when a line image is processed, half tone processing is omitted and the signal is simply binarized. This switch is turned on or off by an operator, who judges the appropriate mode according to the type of the originals.

However, it is common that both a line image with binary tone and gradation image with continuous tone are present in a single document, as in a brochure. In such a case, the binary mode produces poor photographs, while letters are unclear with the gradation mode.

There is another problem in a digital copying apparatus of this type. The image is usually read as a small picture element with a line sensor. If there is a systematic change in density, moire fringes may sometimes appear, due to the interference of the two. A number of image reading sensors are arranged with some pitch, while the density may change in a comparable order of frequency. For instance, photographs are often mesh-printed with regular pitches between the meshes, which are likely to give moire fringes. When 16 image reading sensors are placed in a millimeter, moire fringes are liable if the mesh density is close to that resolution power, that is, from 133 lines (about 10.5 meshes/mm) to 200 lines (16). Moire fringes, of course, may also appear at other densities but at the afore-mentioned density the signals fluctuate by a large amount.

The mesh-printing itself is a sort of simulated expression for continuous tone, in which the density variation at a particular picture element is in a 1/0 (record/not-record) binary fashion. In mesh-printing, a group of picture elements changes as a whole, depending on the pitch of the meshes or the size of the mesh point, thereby reproducing a continuous tone. Accordingly, when a mesh-printed original image is to be copied on a binary machine, moire fringes are liable at a specific density, deteriorating the copy quality.

This problem is less serious when the data is converted into a binary code signal with half tone processing, like averaging the density of a plurality of picture elements, changing the level of the threshold value, etc. In this case, the copied image is also simulated as a group of mesh points. However, they are not a direct reproduction of those on the original: the mesh points being newly formed by the half tone processing.

Accordingly, a mesh-printed or mesh-copied original is better processed in a gradation mode with half tone processing, although picture elements are recorded in a binary fashion.

OBJECT OF THE INVENTION

It is a first object of this invention to obtain a favorable copy from an original document, in which images with intermediate tone and binary images are present together, by automatically discriminating whether each of the regions on the original document is made up of intermediate tone images or binary images.

A second object of this invention is to prevent the occurrence of moire fringes in the case of copying an original which has an image with the intermediate tone expressed by mesh points.

SUMMARY OF THE INVENTION

In order to attain the foregoing objects a digital copying apparatus in accordance with this invention is provided with a region discriminating means for processing electrical signals obtained from an image reading means and discriminating whether or not the original image is an intermediate tone image, signals to be supplied to a recording means such as a printer being switched depending on a signal from the region discriminating means. Specifically, signals processed at the intermediate tone are selected if the region discriminating means detects the presence of the intermediate tone information, whereas signals subjected to a simple binarization are selected if the discriminating means detects the absence of the intermediate tone information.

The region discriminating means includes mesh point detection means comprising a serial-parallel conversion means for simultaneously issuing the signals for a plurality of adjacent picture elements in the main scanning direction and in the sub-scanning direction of the image reading means. A picture element detection means processes a plurality of signals from the serial-parallel conversion means and detects, as to the signals for each of the picture elements, whether or not a picture element to be noted and picture elements therearound are arranged in a mesh-like pattern. A first region detection means processes signals from the picture element detection means and detecting the absence or presence or the number of picture elements which forms the mesh-like pattern in the first region containing a plurality of picture elements. A second detection means processes the signals from the first region detection means and detects the absence or presence of the mesh-like pattern with respect to the second region comprising a group made up of a plurality of first regions, and adapted for detecting whether the arrangement of the black or white picture elements of the original image is mesh-like or not, in which the image is subjected to intermediate tone processing if the meshpoint is detected.

If signals subjected to intermediate tone processing are selected, the image with intermediate tone in density is reproduced on the recording medium, while the image with binary density is obtained if the signals subjected to simple binarization is selected. Since the switching between signals subjected to intermediate tone processing and signals subjected to simple binarizing processing is carried out automatically, the signals are automatically switched on even in a case where images with the intermediate tone, such as photographs, and images with binary density, such as letters, are present together in one original document, by which both of the images with the intermediate tone in density and the images with the binary density are reproduced in a preferred manner on the recording medium.

Further, if the original document to be copied has a mesh point image, since the signals obtained by reading the image from the document are subjected to intermediate tone processing, occurrence of moire fringes can be suppressed.

In order to improve the accuracy of the detection of mesh points, this apparatus may be provided with a third region detection means for detecting the absence or presence of the mesh-like pattern with respect to the third region (different from the second region) comprising a group consisting of a plurality of first regions.

Further, a digital copying apparatus according to this invention is provided with a region discriminating means which includes a mesh point detection means comprising a serialparallel conversion means for simultaneously issuing signals for a plurality of adjacent picture elements in the main scanning direction and in the sub-scanning direction of the image reading means. A picture element detection means processes a plurality of signals from the serial-parallel conversion means and detects whether or not a picture element to be noted and picture elements therearound are arranged in a mesh-like pattern with respect to the signals for each of the picture elements. A region detection means processes the signals from the picture element detection means and detects the absence or presence or the number of picture elements detected for the mesh-like pattern in the elementary region including a plurality of picture elements. A parameter of at least one of the picture element detection means and the region detection means is adjusted depending on the magnification ratio between the read image and the image to be recorded, and the two means are adapted to detect whether the arrangement of the black or white picture elements on the original image is in a mesh-like manner or not, in which case the image is subjected to intermediate tone processing if the mesh point is detected.

If the magnification ratio between the read image and the recorded image is changed, for example, by the optical operation of the magnification ratio, the relationship between the mesh point pitch of the original image and the pitch of the reading sensors varies in the case where the original document has a mesh-point-printed image and the size of the mesh-point pattern appearing in the image reading signal is varied. However, since parameters for the circuit conducting the mesh-point detection are adjusted depending on the magnification ratio in accordance with this invention, absence or presence of the mesh points can be detected at a high level of accuracy even in the case of varying the magnification ratio.

Particularly, in order to improve the accuracy of mesh-point detection, the apparatus, in which the parameters are adjusted, may be provided with a second region detection means for processing the signals from the region detection means and detecting the absence or presence of the mesh-like pattern with respect to the second region comprising a group of a plurality of the elementary regions and a third region detection means for processing the signals from the second region detection means and detecting the absence or presence of the mesh-like pattern with respect to the third region comprising a group of a plurality of the elementary regions.

These and other objects and features of this invention will become apparent by the following description for the preferred embodiments while referring to the accompanying drawings.

BRIEF DESCRIPTION OF THE DRAWINGS

FIGS. 7a, 7b, 7c and 7d are, respectively, electric circuit diagrams of the second discriminating section 72 shown in FIG. 4;

FIG. 10a shows a portion of an image applied with mesh-point printing, FIG. 10b shows binary signals obtained by reading the image shown in FIG. 10a;

FIG. 11 shows the constitution of the first area, the second area and the third area assumed in the first discriminating section 72;

FIGS. 12a and 12b are, respectively, timing diagrams for the operations of the first area detection circuit 170 and the second area detection circuit 180;

FIG. 14(a) shows one example of an original image and FIG. 14(b) shows a copied image obtained from the original shown in FIG. 14a; and FIG. 15a is a block diagram of modified embodiment of the mesh detection circuit and the first area detection circuit, and FIG. 15b is a timing diagram of the operation of the first area detection circuit shown in FIG. 15a.

DETAILED DESCRIPTION OF THE PREFERRED EMBODIMENTS

Figure 2:
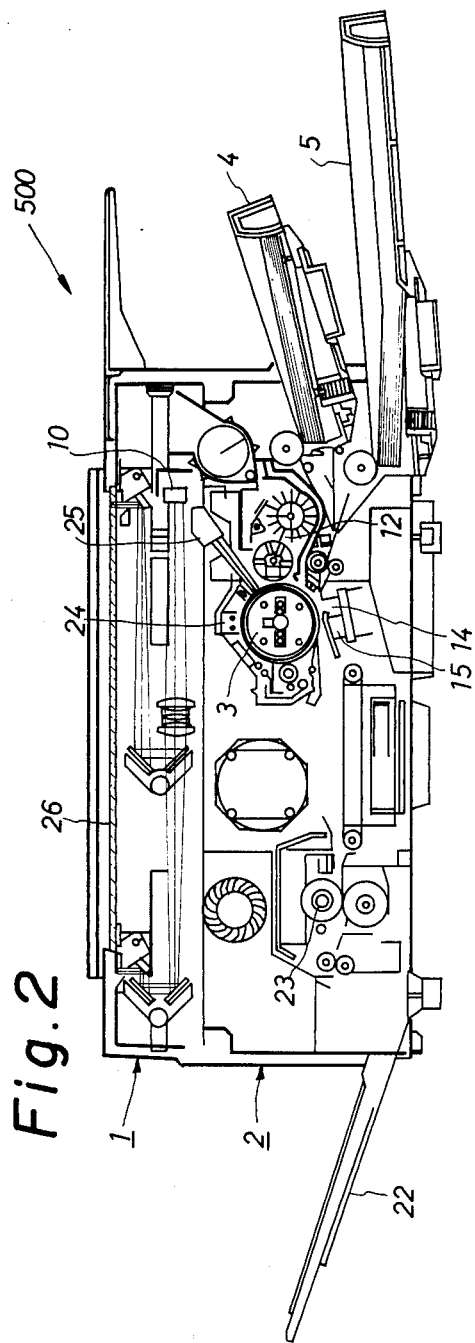
FIG. 2 is a front sectional view of the mechanical section of the copying machine provided with the operation panel shown in FIG. 1.

In FIG. 2, a digital copying apparatus 500 comprises, generally, scanner 1 in the upper portion thereof and printer 2 in the lower portion thereof.

The scanner 1 reads the image of an original placed on contact glass 26 while scanning. The sub-scanning is carried out mechanically, in which a carriage of the scanner 1 is moved right and left in FIG. 2 by electrical motor MT. Reflection light from the original is focused by way of various mirrors and lenses on fixed image reading sensor 10. The image reading sensor 10 comprises CCD line sensors, in which a plurality of reading cells are arranged in the direction perpendicular to the drawing in FIG. 2. In this embodiment, the resolution for the original image is 16 picture elements per 1 mm when the copy magnification ratio is 1.0. The main scanning is electrically conducted by a CCD shift register disposed to the inside of the image reading sensor 10. The main scanning is conducted along with the direction of arranging the reading cells, that is, in the direction perpendicular to the drawing in FIG. 2.

Signals obtained by reading the original image by the scanner 1 are subjected to a number of processes as described later and then supplied to the printer 2 as a recording device. The printer 2 carries out binary recording depending on the supplied signals.

The printer 2 comprises laser writing unit 25, photosensitive drum 3, electric charger 24, developing device 12, transfer charger 14, separation charger 15, fixing device 23 and the like. Since the printer 2 is no different than an ordinary conventional laser printer, only the operation thereof is explained.

The surface of the photosensitive drum 3, which is rotated clockwise in FIG. 2, is uniformly charged to a high potential by the electrical charger 24. A laser beam modified by binary signals depending on the image to be recorded is irradiated to the charged surface of the drum 3. The laser beam scans over the photosensitive drum 3 repeatedly in the main scanning direction. The potential on the charged surface of the photosensitive drum 3 is changed when undergoing the irradiation of the laser beams. Accordingly, a potential distribution depending on the irradiation or non-irradiation of the laser beam forms an, the image to be recorded on the surface of the photosensitive drum 3. The potential distribution corresponds to the electrostatic latent image. When the portion formed with the electrostatic latent image passes the developing device 12, toners are deposited depending on the potential and the electrostatic latent image is developed into a toner image, that is, a visible image. The visible image is overlaid on a transfer paper sheet supplied from paper feed cassette 4 or 5 to the photosensitive drum 3 and transferred on the transfer paper sheet by the aid of the transfer charger 14. The transfer paper sheet transferred with the image is passed through fixing device 23 and discharged to a tray 22.

Figure 1:
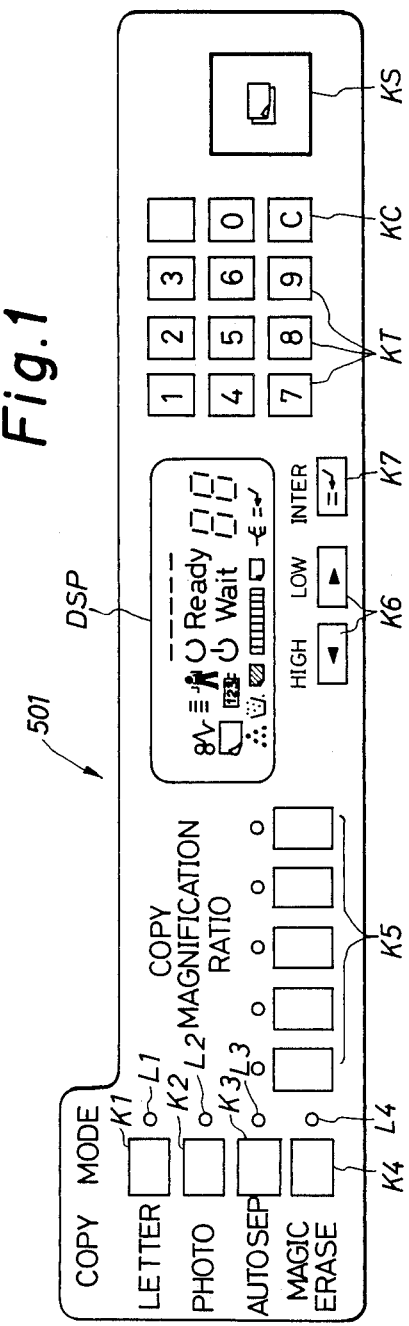
FIG. 1 is a plan view of the operation panel of a copying machine according to the present invention.

As shown in FIG. 1, an operation panel 501 of the digital copying machine 500 is equipped, in the same manner as an ordinary copying machines, with copy magnifying ratio key K5, density key K6, interruption key K7, ten key KT, clear/stop key KC, print start key KS, display DSP and the like. Particularly, in this embodiment, the panel is further provided with a copy mode designating section. The copy mode designating section is equipped with four mode keys K1, K2, K3 and K4, as well as lamps or LED (light emitting diodes) L1, L2, L3 and L4 for visibly indicating the present operation mode.

The mode key K1 is a key for designating the letter mode. When the letter mode is selected, the read image signal is processed in a complete binary manner. That is, upon reading an original document, those areas with a lower density than a predetermined threshold value density are regarded as white (non-dot) picture elements, while other areas are regarded as dot picture elements. The respective read picture elements and the recorded picture elements are in 1:1 correspondence. Accordingly, resolution is high and a copy image with high quality can be obtained if the original image has no intermediate tone density as in the case of a letter.

The mode key K2 is a key for selecting the photograph mode. When the photograph mode is selected, the scanned image is processed while being regarded as including the intermediate tone information in the original image and the information for the density level of the original image is reflected also on the copy image. However, since the printer 2 can only perform binary recording (recording/not-recording) by the unit for each of the recorded picture elements, multivalue signals are converted into binary signals by special treatment for the intermediate tone. While a dither method, a density pattern method and a sub-matrix method have been known as the intermediate tone processing of this kind, intermediate tone processing by the sub-matrix method is adopted in a preferred embodiment.

In the photograph mode, a favorable copy image can be obtained for the multi-gradation image but, owing to the intermediate tone processing, the resolution is degraded and it is not suitable to the reproduction of a binary image such as a letter.

The mode key K3 is a key for selecting the automatic separation mode. In the automatic separation mode, it is automatically decided whether or not the original image contains intermediate tone information based on the image signals read by the scanner 1. Switching is automatically conducted, based on the result of the decision, whether the signal processing is conducted in a binary manner or in an intermediate tone processing. In the case where this mode is selected, if a photograph containing intermediate tone information and a letter not containing the intermediate tone information are present together in one original document, the processing is switched during reading and the intermediate tone processing is carried out for the photograph, while the binary processing is carried out for the letter. Accordingly, the photograph is reproduced on the copy in the form of an image including the intermediate tone information, while the letter is recorded at a high resolution power.

The mode key K4 is a key for selecting the magic erase mode. In the magic erase mode, if the original image contains thick lines or the like, a copy image in which the inside of the lines is erased while leaving only the peripheral portion thereof can be obtained. Further, if there is a pattern coated with ink of a felt tip pen at a low density, a copy image removed with the pattern can be obtained. The detailed description will now be described.

Figure 3:
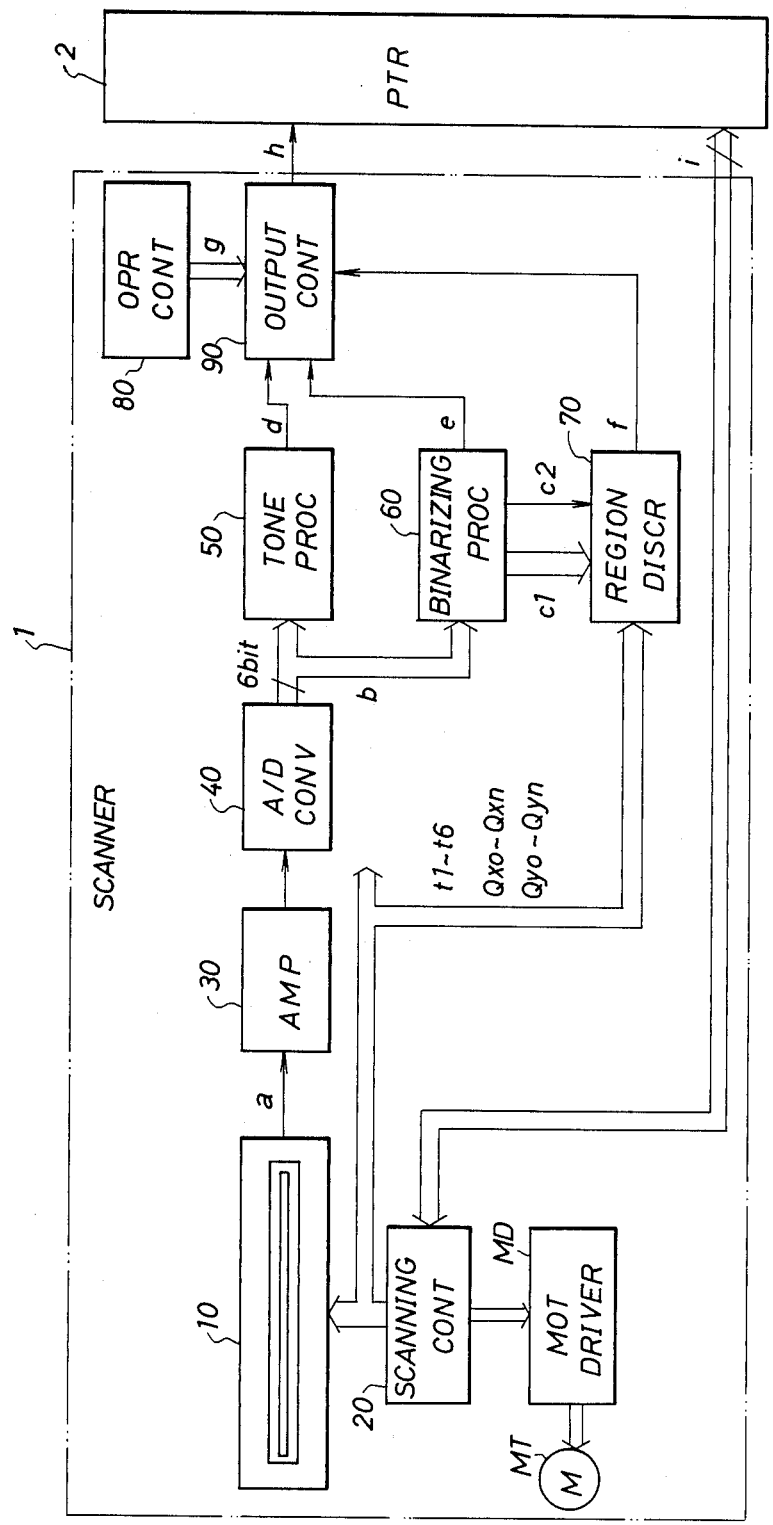
FIG. 3 is a block diagram of the electric circuit for the copying machine according to the present invention.

As shown in FIG. 3, the scanner 1 comprises the image reading sensor 10, scanning control section 20, amplifier 30, A/D (analog/digital) converter 40, intermediate tone processing section 50, binarizing processing section 60, region discriminating section 70, operation control section 30, output control section 90, motor driver MD.

The scanning control section 20 transmit and receives signals i to and from the printer 2 and generates a main scanning control signal, a subscanning control signal and various timing signals. Various timing signals are synchronized with the scanning timing. Key reading control and display control other than the copy mode designation on the operation panel shown in FIG. 1 are carried out on the printer 2. Various state signals, print start signal, copy magnification ratio signals and the like are supplied from the printer 2 to the scanning control section 20. The scanning control section 20 delivers a scanning sync signal, state signal and the like to the printer 2. By driving the motor MT, the scanner 1 is mechanically moved to perform sub-scanning.

Like ordinary CCD line sensors, the image reading sensor 10 is equipped with a plurality of reading cells, CCD shift registers and the like. When the scanning control section 20 outputs a sub-scanning sync signal, signals stored in a plurality of reading cells of the image reading sensor 10 are transferred all at once to the CCD shift register. Then, image signals stored in the CCD shift register are shifted in synchronization with the main scanning pulse signal and appear as serial signals a to the output terminal of the sensor 10, the signal stores in each stage of the CCD shift register corresponding to each picture element.

The amplifier 30 amplifies the image signal a while eliminating noises, etc. The A/D converter 40 converts analog image signal a into 6-bit parallel digital signals. The digital signals obtained from the A/D converter 40 are outputted as 6 bit signals, that is, as digital image signals b at 64 gradations after undergoing various image processes such as shading compensation, background elimination and black and white conversion.

The digital image signal b is applied to intermediate tone processing section 50 and binarizing processing section 60.

The intermediate tone processing section 50 converts the 6 bit digital image signals b into binary signals d containing the intermediate tone information by the sub-matrix method. The circuit for conducting the intermediate tone processing by the sub-matrix method has been known and, since no particular circuit is used in this embodiment, specific construction and operation for the circuit are omitted. Further, intermediate tone processing by the dither method or the density pattern method can also be applied in place of the sub-matrix method.

The binarizing processing section 60 applies MTF (modulation transfer function) compensation to the inputted 6 bit digital image signal b, compares the compensated signal with a predetermined threshold level TH1 and outputs a binary signal e depending on the result of the comparison. Accordingly, the processing conducted here is a simple binarizing processing and the signal e contains no information for the intermediate tone density of the original image.

Further, the binarizing processing section 60 outputs the 6 bit parallel digital image signal C1 and 1 bit binary image signal C2 to the region judging section 70. The image signal C1 is applied with MTF compensation and has no substantial difference with the image signal b applied to the binarizing processing section 60. Further, the signal C2 is identical with the binary image signal e outputted from the binarizing processing section 60 except for the time relationship.

The region discriminating section 70 comprises a circuit for discriminating whether or not the original image contains the intermediate tone as described later and outputs a binary signal f depending on the result of the discrimination to the output control section 90.

The operation control section 80 supplied mode signals g: specifically, g1, g2, g3 and g4 depending on the operation of the mode keys K1-K4 to the output control section 90. Further, it also controls the drive for the indicating lamps L1-L4 depending on the mode signals.

The output control section 90 selectively outputs the binary image signal d outputted from the section 50, the binary image signal e outputted from the section 60 and a signal with a predetermined level (white level) depending on the mode signal g supplied from the section 80 and the binary signal f supplied from the section 70. The signal h issued from the section 90 is supplied as a recording signal to the printer 2. The printer 2 modifies the laser beams depending on the binary signal h and conducts recording, that is, printing.

Figure 4:
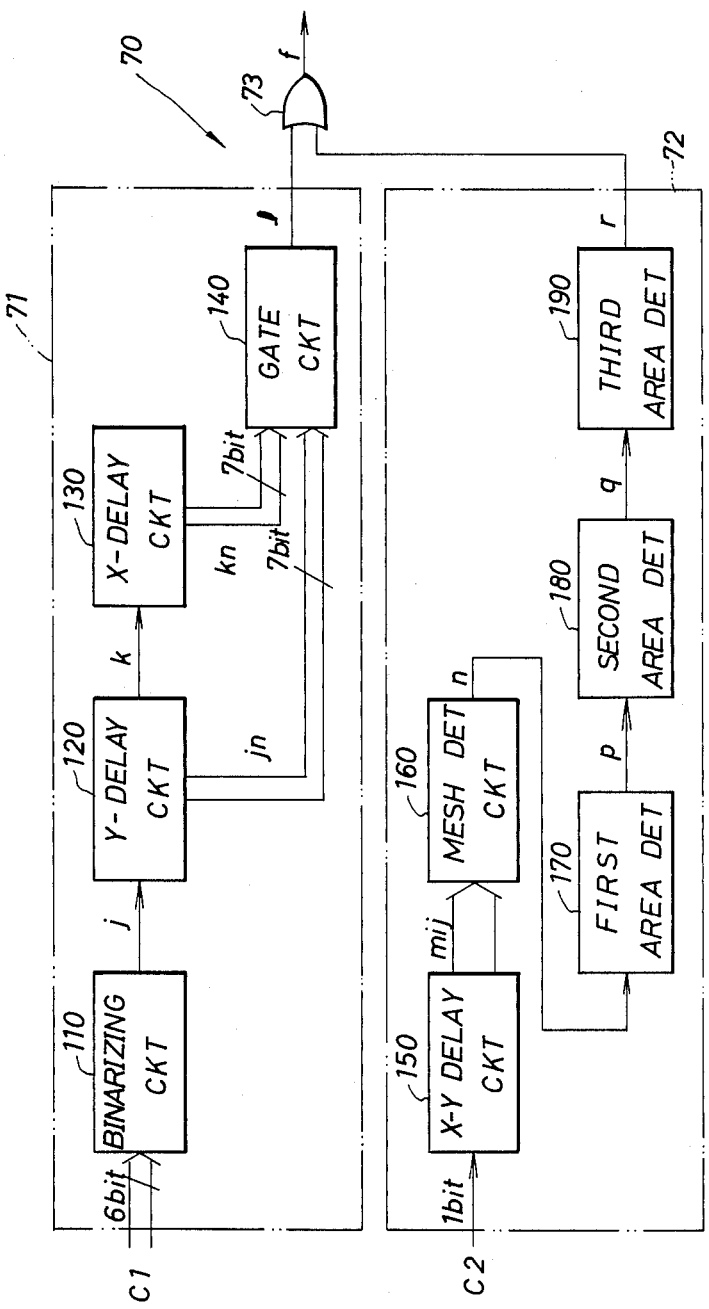
FIG. 4 is a block diagram of the region discriminating section shown in FIG. 3.

As shown in FIG. 4, the region discriminating section 70 comprises first discriminating section 70, second discriminating section 72 and OR gate 73. Parallel 6 bit image signal C1 is applied to the first section 71, while 1 bit binary image signal C2 is applied to the second section 72. The OR gate 73, which receives the signal l outputted from the section 71 and the signal r outputted from the second section 71 issues a signal f at the output thereof which is a output terminal of the section 70. The first section 71 comprises binarizing circuit 110, Y-delay circuit 120, X-delay circuit 130 and gate circuit 140.

In this specification, symbol x or X is used for indicating the main scanning direction of the scanner 1 and symbol y or Y is used for indicating the sub-scanning direction. Further, "1" on the binary image signal corresponds to a black picture element, while "0" corresponds to a white picture element.

Figure 5:
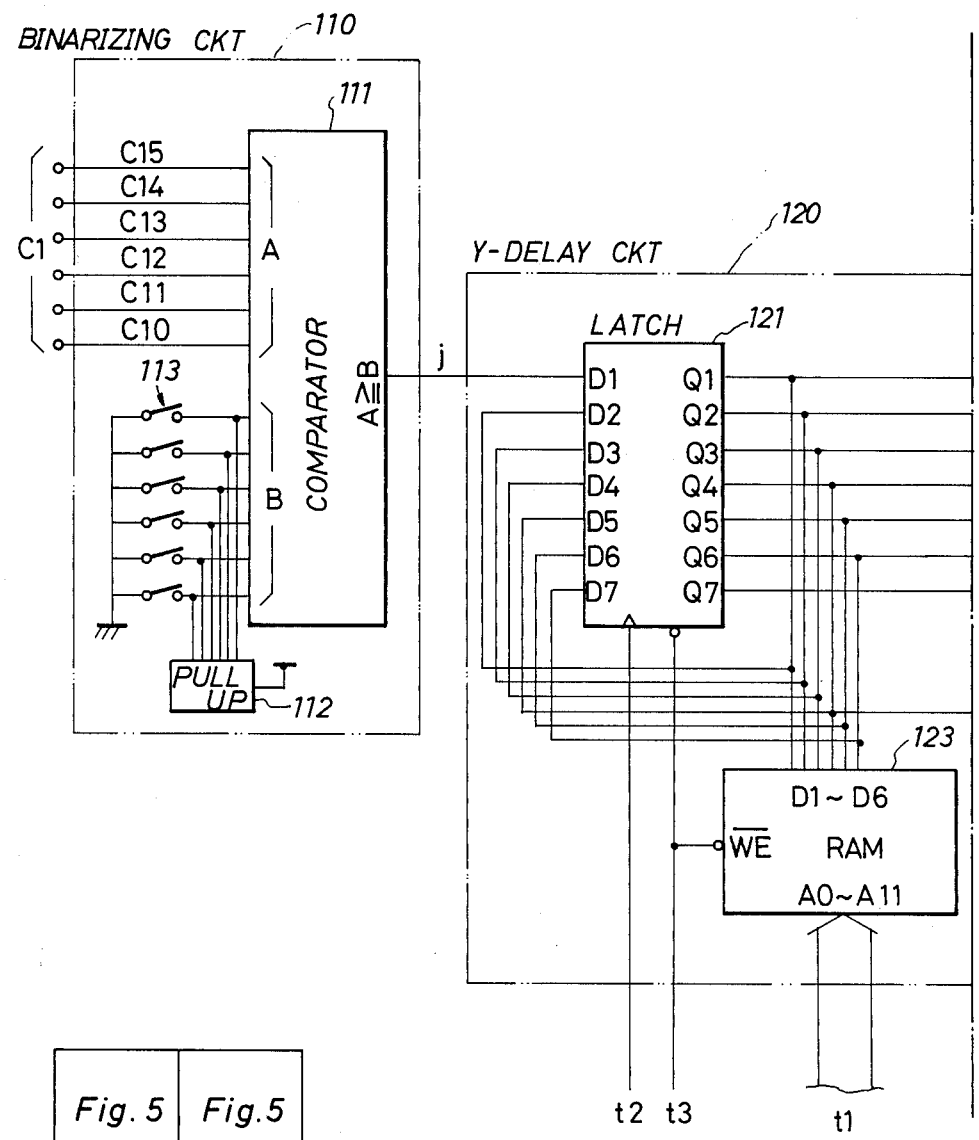
FIG. 5 is an electric circuit diagram of the first discriminating section 71 shown in FIG. 4.

As shown in FIG. 5, the binarizing circuit 110 comprises digital comparator 111, pull-up circuit 112 and switch circuit 113. The digital comparator 111 compares the value of the digital signal applied to the 6 bit input terminal A with the value of the digital signal applied to the other 6 bit input terminal B and outputs the result of the comparison.

That is, if the value applied to the terminal A is equal to or greater than the value applied to the terminal B, the signal j is logic "1" (corresponding to high level H) or otherwise the signal j is logic "0" (corresponding to level L).

Each of the switches in the switch circuit 113 is so set that the value at the input terminal B of the comparator 111 is at a predetermined threshold value TH2. Although the threshold value TH2 can be changed by means of the circuit 113, the value TH2 is usually set to a considerably low level of density as shown in FIG. 6b. The threshold value TH1 utilized by the binarizing processing section 60 is set to an intermediate level 32 of the density gradation in this embodiment.

That is, in the binarizing circuit 110, a picture element with a lower density level than the usual level for detecting the black picture element is also treated as a black element.

The Y-delay circuit 120 delays the signal j by the time corresponding to the predetermined number of the picture elements in the direction y, that is, in the sub-scanning direction and issues seven signals jn (n=0, 1, ---- 6) and signal k. In FIG. 5, the signal jn represents a signal prepared by delaying the signal j by n picture elements in the direction y. The signal k is identical with the signal j3 with respect to the delay. By delaying the signals by each of the picture elements in the y direction, signals for a plurality of picture elements adjacent with each other in the y direction can be taken out as parallel signals. Thus, the circuit can also be regarded as a serial-parallel conversion circuit.

Figure 6A:
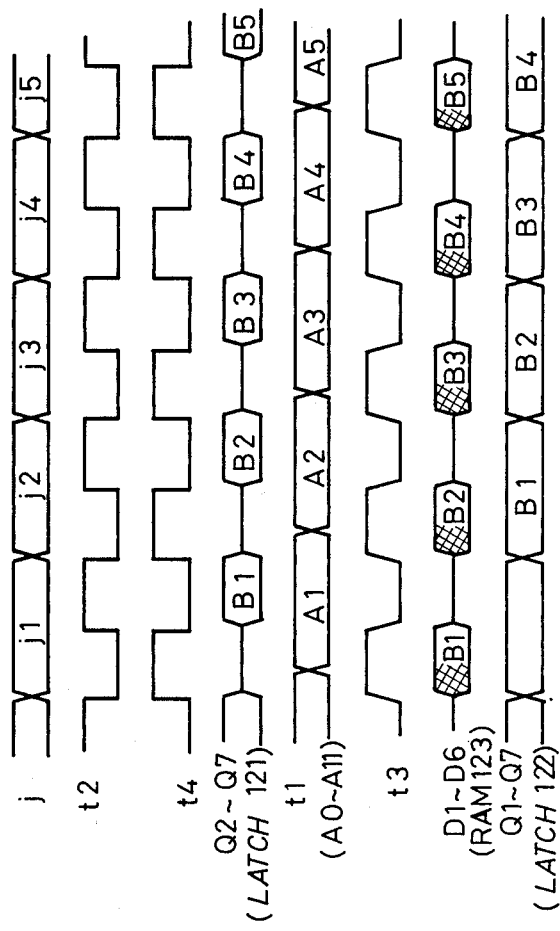
FIGS. 6a and 6b are timing diagrams, for the operation of the circuit shown in FIG. 5.
Figure 6B:
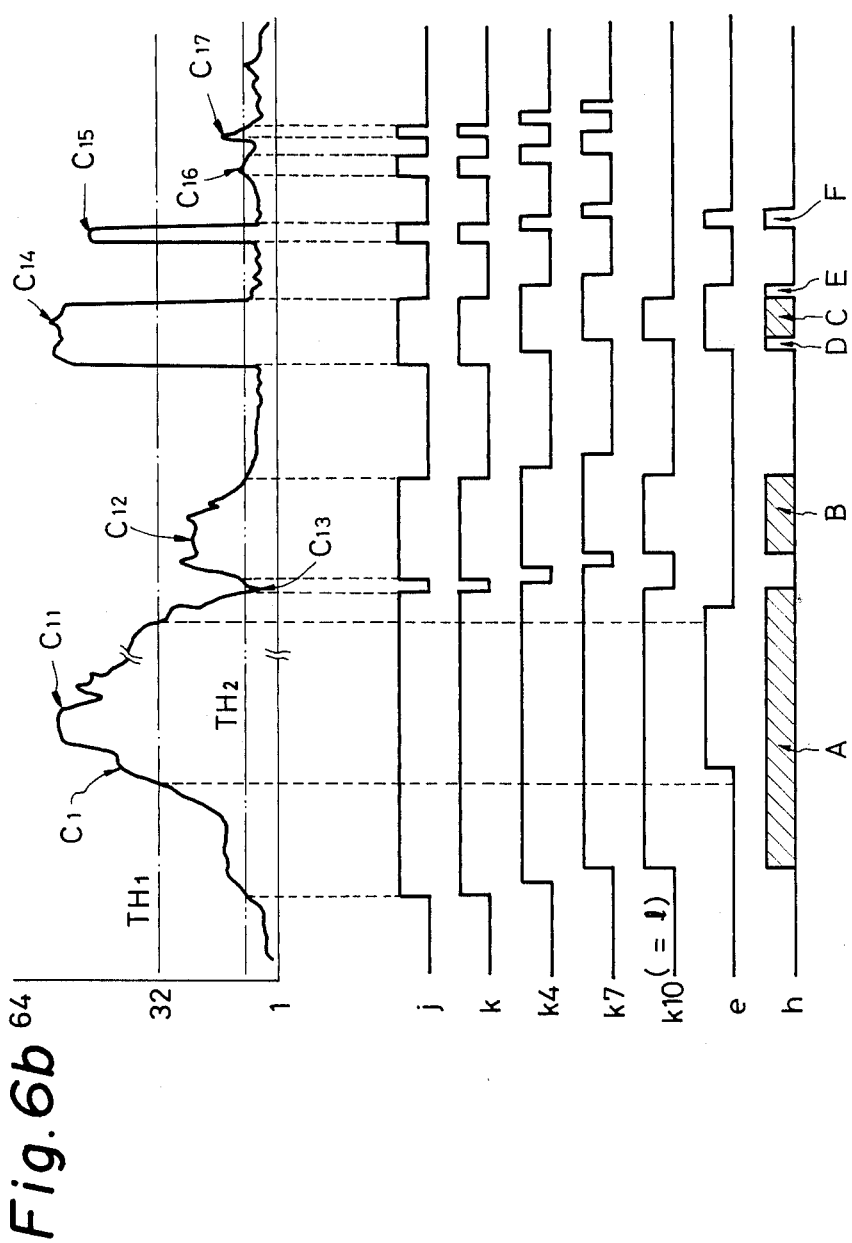

As shown in FIG. 6a, the input signal j is latched to a latch 121 by clock pulse t2 outputted in synchronization with the occurrence of each picture element in the direction x. That is, the signal j applied to the terminal D1 of the latch 121 appears on the output terminal Q1 and latched at that state. The states at the output terminals Q1-Q6 of the latch 121 are stored in the respective address of RAM (randam access memory) 123 in synchronization with the occurrence of each picture element in the direction X by clock pulse t3.

The memory address at which the logic state of the terminals Q1-Q6 is stored is designated by address signal t1. The content of the address signal t1 is updated for every picture element in the x direction and the same content (value) is set to the picture element at the same position in the x direction x. That is, the signal t1 corresponds to the position of the picture element in the x-scanning direction. In this embodiment, since the number of picture elements in the direction x is 4,096, the signal t1 comprises a 12 bit parallel signal.

The contents stored in the RAM 123 are read out on every picture element in the scanning direction x by the clock pulse t3. The read out data are the data previously stored at the position in the direction x at that time. Taking notice of the connection between data lines D1-D6 of the RAM 123 and the latch 121, the bits 1, 2, 3, 4, 5 and 6 of the data lines of the RAM 123 are, respectively, connected to the bits 2, 3, 4, 5, 6 and 7 of the input terminals of the latch 121 while being shifted each by one bit.

Accordingly, the signal j inputted at a certain timing is latched to the bit 1 of the latch 121 and stored into the bit 1 of the RAM 123 before the next picture element data are set to the latch 121. Then, it is read out from the bit 1 of the RAM 123 at a timing delayed by one picture element in the direction y, and then applied to the input terminal D2 for the bit 2 of the latch 121. The signal is latched to the bit 2 of the latch 121 at the time when the picture element signal with a delay for one picture element in the y direction is latched in the x direction to the bit 1 of the latch 121.

Then, by repeating the foregoing operations, the signals are sequentially transferred to bits 3, 4, 5, 6 and 7 of the latch 121 every time the image to be read by the scanner 1 is advanced by one picture element in the y direction. That is, when the signal is latched to the bit 7 of the latch 121, those signals delayed by 1, 2, 3, 4, 5 and 6 picture elements in the y direction from the signal of the bit 7 respectively are present at each of the bits 6, 5, 4, 3, 2 and 1 of the latch 121. In this way, signals for 7 picture elements adjacent to each other in the y direction at a predetermined position x can be obtained at the same time on the output terminals Q1-Q7 of the latch 121.

The latch 122 serves to adjust the timing for sending signals to a circuit connected to the output of the Y-delay circuit 120. Accordingly, the signals J0-J6 are substantially identical with the signals outputted from the latch 121.

In FIG. 6a, j1, j2, ----, B1, B2, B3, ---- and A1, A2, A3, ---- represent the changes in each of the signals for every picture element in the direction x and it should be noted that they are different from the signals outputted from the latch 122.

The signal k outputted from the Y-delay circuit 120 is applied to the X-delay circuit 130. As shown in FIG. 5, the X-delay circuit 130 comprises one shift register. The signal k is applied to the serial data input terminal of the shift register. Signals k1, k2, k3, k4, k5, k6 and k7 are outputted from the parallel data output terminals Q1-Q7 of the shift register. The shift register 130 shifts the data therein by the clock pulse t4 which is supplied on every change of the scanning position in the direction x by the picture element unit. For instance, the signal k applied to the shift register at a certain time appears to bit 1 of the output terminal k1 on the next time at which the next picture element in the direction x is supplied to the shift register 130 and it is successively transferred to bits 2, 3, 4, 5, 6 and 7 on every change of the picture element timing.

For example, when a signal for the picture element situated at N on the picture element coordinate in the direction x appears as the signal k7, the positions for the picture elements appearing in the respective signals k6, k5, k4, k3, k2 and k1 are identical with the position for k7 in the direction y and at N+1, N+2, N+3, N+4, N+5 and N+6 respectively in the direction x. That is, the signal k1-k7 correspond to 7 picture elements at the position of the picture elements adjacent to each other in the x direction x and they are obtained at the same time. Accordingly, the X-delay circuit 130 can also be regarded as a serial-parallel conversion circuit for the serial picture element signals.

The signals j0-j6 and k1-k7 outputted from the Y-delay circuit 120 and the X-delay circuit 130 are applied to the logic circuit 140. AND gate 141 outputs "1" when all of the signals j0-j6 are "1" and outputs "0" in other cases. Accordingly, the signal j10 outputted from the AND gate 141 is "1" when all of the 7 picture elements at an identical position in the direction x and in adjacent with the direction y are at the black level (relative to TH2). The signal j10 is shifted in shift register 143 by a predetermined picture element (i elements) in the direction x and applied as signal j11 to AND gate 144. AND gate 142 outputs "1" when all of the signals k1-k7 are "1", while outputs "0" in other cases. Accordingly, signal k10 outputted from the AND gate 142 is "1" when all of the 7 picture elements at an identical position in the direction y and in adjacent with each other in the direction x are at the black level TH2. The AND gate 144 outputs a logical product of the signal j11 and signal k10, that is, the signal l.

That is, section 71 detects the presence of the information of an intermediate tone (l is 1) when all 7 picture elements in the direction x and 7 picture elements in the direction y surrounding one picture element are at the black level TH2. The shift register 143 is disposed to shift the signal j10 in the direction x and deliver the signal j11, in order to adjust the timing for the 7 picture elements in the direction x and the 7 picture elements in the direction y.

That is, since the signals j0-j6 are at an identical position with that for the signal k with respect to the direction x, the signal j10 is shifted in the direction x by i picture elements (4 picture elements in this case) for obtaining the signal j11 at the position x corresponding to the signal k4 that corresponds to the central picture element in the direction x. That is, when considering minute patterns, since most of them are generally circular in shape, it is preferable to consider the picture element to be noted as the central picture element among the group of picture elements constituting a (+) pattern.

FIG. 6b shows certain signals only in the direction x for the sake of the simplicity. Since the digital image signal C1 is a 6 bit signal, it contains 64 steps of information for density gradation. In this example, each of the portions C11, C12 of the signal C1 shown in FIG. 6b indicates a signal prepared by reading an intermediate tone image such as a photograph. Signal C13 indicates a signal obtained by reading a background (white) image. A portion C14 indicates a signal obtained by reading a letter written with relatively fat lines (that is, binary density picture element. A signal C15 indicates a signal obtained by reading a letter written with relatively thin lines. Each of the signals C16, C17 indicates a signal obtained by reading the contaminations on the original document.

Since the binarizing circuit 110 effects binarization of the signals by setting the level TH2 at a low density as a threshold value level, all of the portions in which images are present correspond to the black picture elements in the obtained image signal j even if the image density is extremely low. On the other hand, in the signal e outputted from the binarizing processing section 60 in which the intermediate level 32 is set as a threshold value, those portions at a low density correspond to the white picture elements and only the portion at a high density corresponds to the black picture elements regarding the intermediate tone image.

Since the signal k10 is "1" only when the black portions of the image signal appear continuously for 7 picture elements in the direction x, that is, when the pattern is larger than a predetermined size, the signal k10 is "1" for each of the image signal portions C11, C12 and C14 but it is "0" for other portions C13, C15, C16 and C17. Since signal d after being subjected to intermediate tone processing and signal e after being subjected to binarization are usually selected based on the signal k10, the portions indicated by A, B and C of signal h correspond to signal d after being subjected to the intermediate tone processing, while other portions D, E and F of signal h correspond to signal e after being subjected to the binarization in FIG. 6b. In this case, the portions C, D and E correspond to one letter on the original. However, since portion D and E (each 6 picture elements in the direction x) which correspond to the contour of said one letter, are less than 7 picture elements (which is one of the references for discriminating the intermediate tone information), they are subjected to binarization. Since each of the portions C16, C17 in the image signal C1 is subjected to binarization relative to the threshold value TH1, contaminations in the original are not outputted as a copy image.

Referring to FIG. 4, the second discriminating section 72 discriminates the absence or presence of the mesh-like pattern. The signal C2 processed in section 72 is prepared by simply binarizing the signal C1 relative to a fixed threshold level TH1 and it can be considered identical with the signal e outputted from the binarizing processing section 60 when the timing or the like is not taken into consideration.

Section 72 comprises X-Y delay circuit 150, mesh detection circuit 160, first area detection circuit 170, second area detection circuit 180 and a third area detection circuit 190. The X-Y delay circuit 150 processes the signal C2 to output signal mij, the mesh detection circuit 160 processes the signal mij to output signal n, the first area detection circuit 179 processes the signal n to output signal p, the second area detection circuit 180 processes the signal p to output signal q and the third area detection circuit 190 processes the signal q to output signal r.

Figure 7A:
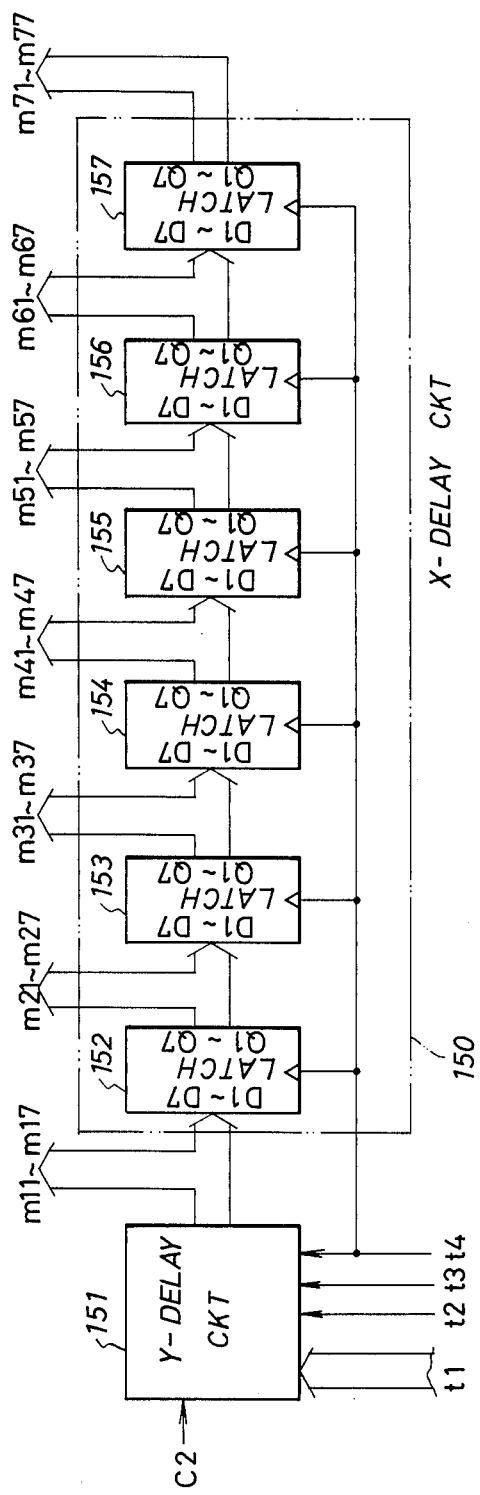

As shown in FIG. 7a the X-Y delay circuit 150 comprises Y-delay circuit 151 and X-delay circuit. The Y-delay circuit 151 is constituted in the same manner as the Y-delay circuit 120 shown in FIG. 5. However, since the signal corresponding to the above-mentioned signal k is not necessary, the output terminal utilizes only the 7 outputs from the latch 122. That is, signals m11–m17 outputted from the Y-delay circuit 120 correspond to 7 picture elements at an identical position in the x direction and in adjacent with each other in the y direction.

The X-delay circuit comprises six 7 bit latches 152, 153, 154, 155, 156 and 157. The latch 152 latches the signals m11–m17 outputted from the Y-delay circuit, while the latches 153, 154, 155, 156 and 157 latch the signals m21–m27, m31–m37, m41–m47, m51–m57 and m61–m67 outputted from the latches 152, 153, 154, 155 and 156 respectively synchronized with clock pulse t4. Accordingly, each of the signals m21, m31, m41, m51, m61 and m71 forms a signal prepared by delaying the signal m11 in the direction x by 1, 2, 3, 4, 5 and 6 picture elements.

That is, the X-Y delay circuit 150 outputs signal mij for each of the picture elements in a 7×7 picture element matrix having 7 picture elements in the x direction and 7 picture elements in the y direction respectively all at an identical timing.

Figure 7B:
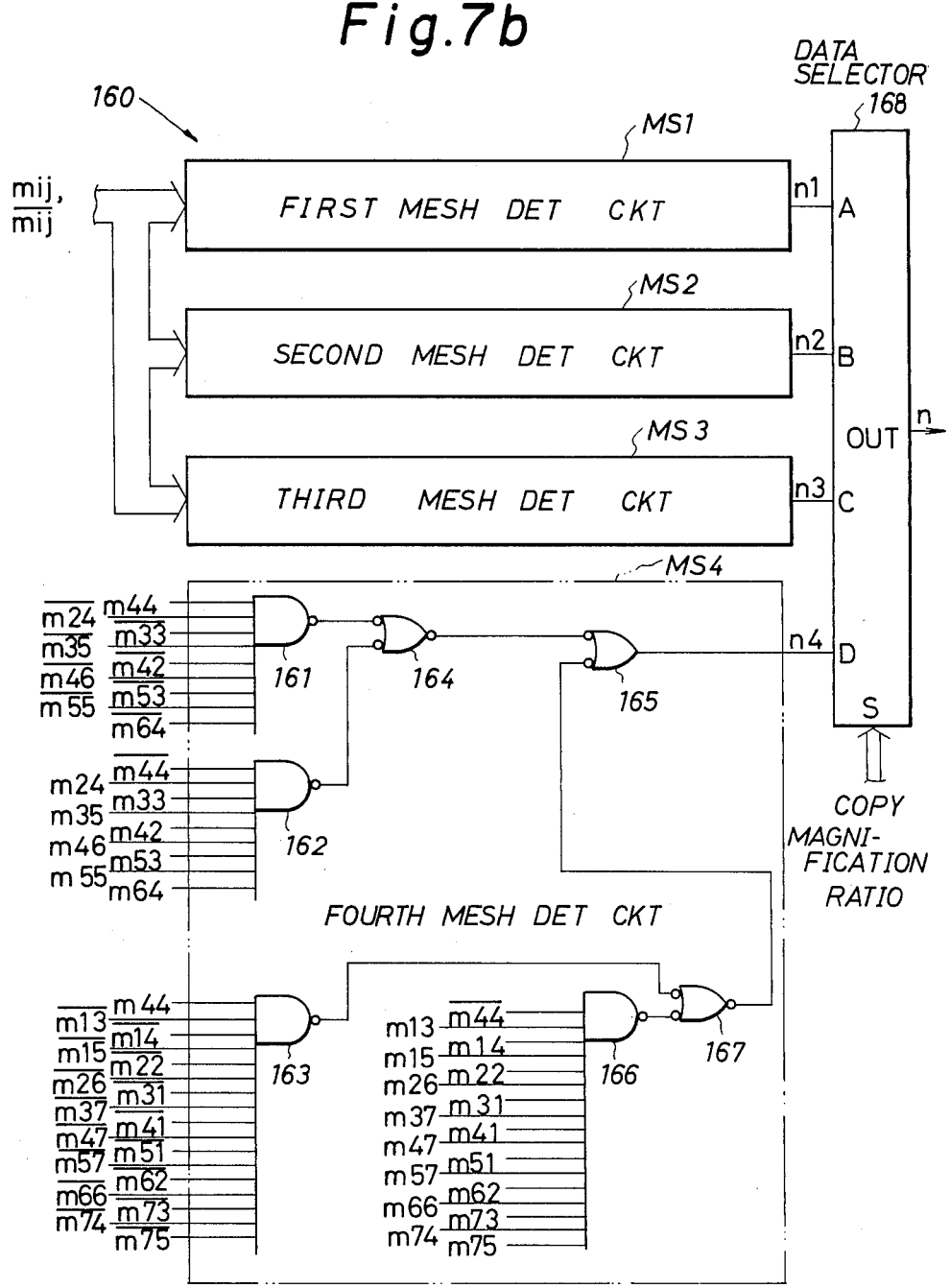

Referring to FIG. 7b, the mesh circuit 160 comprises first mesh detection circuit MS1, a second mesh detection circuit MS2, third mesh detection circuit MS3, fourth mesh detection circuit MS4 and data selector 168. The signal mij outputted from the X-Y delay circuit 150 is applied to each of the mesh detection circuits MS1–MS4.

As shown in the FIG. 7b, the fourth mesh detection circuit MS4 comprises gates 161, 162, 163, 164, 165, 166 and 167. In the FIG. 7b, the signal $\overline{mij}$ is prepared by logically inverting a signal mij. Accordingly, there are interposed a plurality of inverters between the output terminal of the XY-delay circuit 150 and the input terminals of the mesh detection circuit 160 although not illustrated in the drawing.

Signals m44, $\overline{m24}$, $\overline{m33}$, $\overline{m35}$, $\overline{m42}$, $\overline{m46}$, $\overline{m53}$, $\overline{m55}$ and $\overline{m64}$ are applied to 9 input terminals of the gate 161, signals $\overline{m44}$, m24, m33, m35, m42, m46, m53, m55 and m64 are applied to 9 input terminals of the gate 162, signals m44, $\overline{m13}$, $\overline{m14}$, $\overline{m15}$, $\overline{m22}$, $\overline{m26}$, $\overline{m31}$, $\overline{m37}$, $\overline{m41}$, $\overline{m47}$, $\overline{m51}$, $\overline{m57}$, $\overline{m62}$, $\overline{m66}$, $\overline{m73}$, $\overline{m74}$ and $\overline{m75}$ are applied to 17 input terminals of the gate 163, and signals m44, m13, m14, m15, m22, m26, m31, m37, m41, m47, m51, m57, m62, m66, m73, m74 and m75 are applied to 17 input terminals of the gate 166.

Figure 8:
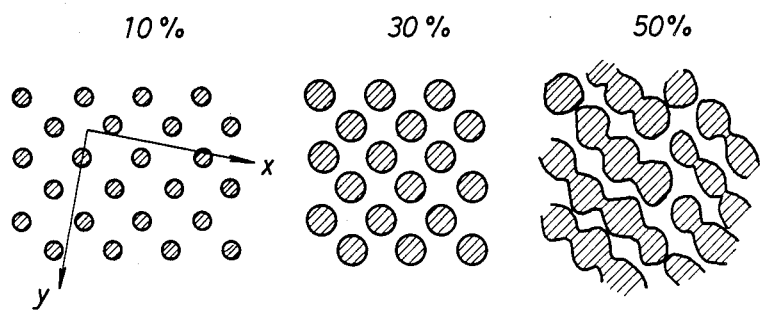
FIG. 8 shows the enlarged image printed with mesh point at three types of densities.

Before explaining the operation of the mesh detection circuit 160, consideration is given to mesh point printing. FIG. 8 shows each portion of images at 3 kinds of density (10%, 30% and 50% reflectivity) which are printed at an identical mesh point pitch in such an enlarged scale that the mesh points can be identified easily. The hatched portions are printed (black) areas and other portions are background (white). Although not illustrated, in the case where the density of the images is 70% and 90%, they are in the form where the black/- white relationship is reversed so that the density of the images is 30% and 10% respectively.

Referring to FIG. 8, in the case of 50% density, it can be seen that there are portions where adjacent dots are in contact with and apart from each other. Further, the inclination between the direction of arranging the dots and the scanning directions x, y of the scanner is not constant in actually reading the original in view of the relationship of the inclination between the scanner and the original, etc. Further, the diameter of the recorded dots also varies.

Absence or presence of such mesh points have to be discriminated in section 72.

Referring to FIG. 8, it can be seen that black points (dots) are present on the white background or white points (dots) are present on the black background in any of the mesh pointprinted original images. Then, the mesh detection circuit 160 detects the correspondence of each picture element to any one of the dot patterns.

Figure 9:
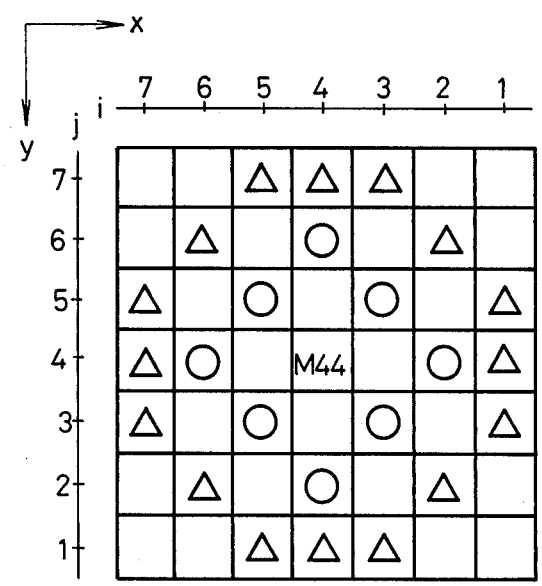
FIG. 9 shows the arrangement of picture elements which are utilized for the detection of the absence or presence of dots in the mesh detection circuit 160.

Referring to FIG. 9, from the relationship between the central picture element in the 7×7 picture element matrix, that is, the picture element M44 (picture element corresponding to the signal m44) and picture elements indicated by symbols O or Δ surrounding the central element M44, the fourth mesh detection circuit MS4 determines whether the picture element M44 is a black dot (presence of black picture element in the group of white picture elements) or a white dot (presence of a white picture element in the group of black picture elements).

That is, the gate 161 outputs a signal "0" (a signal indicating the presence of the black dot), if the picture element M44 is "1" (black picture element) and all of the picture elements represents by the symbol O are "0" (white picture element), the gate 162 outputs a signal "0" (a signal indicating the presence of the white dot), if the picture element M44 is "0" and all of the picture elements indicated by the symbol O are "1", the gate 163 outputs a signal "0" (a signal indicating the presence of the black dot), if the picture element M44 is "1" and all of picture elements represented by the symbol Δ are "0", and the gate 166 outputs a signal "0" (a signal indicating the presence of the white dot), if the picture element M44 is "0" and all of the picture elements represented by the symbol Δ are "1". If any one of the gates 161, 162, 163 and 166 outputs a signal indicating the presence of the black dot or white dot, a signal "1", that is, a signal indicating the presence of the dot is outputted, while a signal "0", that is, a signal indicating the absence of the dot is outputted in other cases, as signal n4 from the fourth mesh detection circuit MS4.

In this case, 2 types of patterns comprising the group of picture elements at the position indicated by the symbol O and the group of picture elements at the position indicated by the symbol Δ are referred to in this embodiment for the picture element M44, so that the detection accuracy can be increased even if the mesh point pitch and the dot diameter should vary.

The first mesh detection circuit MS1, the second mesh detection circuit MS2 and the third mesh detection circuit MS3 are all constructed in the same manner as the fourth mesh detection circuit MS4, excepting that the signal mij and the signal $\overline{mij}$ applied to each of the input terminals is different from that in the circuit MS4. The positions for the picture elements utilized in the discrimination for the absence or presence of the dots are different respectively in each of the mesh detection circuits MS1-MS4. The change of the condition is previously set, particularly, for the respective copy magnification ratios, while expecting the change in the dot diameter caused by the change of the copy magnification ratio.

Referring to FIG. 7b, a signal line for the copy magnification ratio is connected to the section terminal S of data selector 168. Accordingly, if the copy magnification ratio changes, any one of the signals n1, n2, n3 and n4 outputted from each of the mesh detection circuits MS1-MS4 is selectively outputted as the signal n from the data selector 168 in accordance with the ratio. That is, in this embodiment, the mode for the dot detection is automatically changed by the copy magnification ratio.

Figures 10A, 10B:
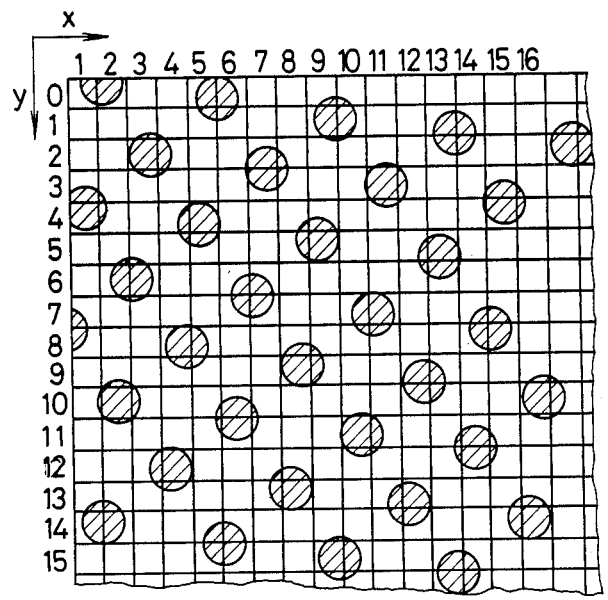

FIG. 10a shows an example of a positional relationship between dots and picture elements upon reading mesh-like image and FIG. 10b shows the arrangement of signals prepared by binarizing each of the picture element signals in FIG. 10a by the threshold value TH1. In these figures, the pitch of the picture element is 1/16 (mm/picture element), and the pitch of the mesh point is 1/5 (mm/picture element). Further, the values on the x and y coordinates are the same for the images in FIG. 10a and FIG. 10b.

Referring to FIGS. 10a and 10b, since the picture element on the coordinate (x=15, y=4) is "1" and all of 9 picture elements represented by the symbol O in FIG. 9 are "0", it is decided for the picture element that a dot is present.

While the signal n showing the absence or presence of a mesh point is basically obtained at the output of the mesh detection circuit 160 as described above, since the positional relationship between the picture element and the mesh point changes variously, a processing operation described later will be applied.

The first area detection circuit 170 in FIG. 7c discriminates whether or not one or more dots are present in the first area while assuming a predetermined picture element matrix comprising w picture elements (for example 8 picture elements) in the direction x and w picture elements in the direction y as shown in FIG. 11 (hereinafter referred to as the first area). The signal P is "1" if the dot is present and "0" if the dot is absent.

Figure 7C:
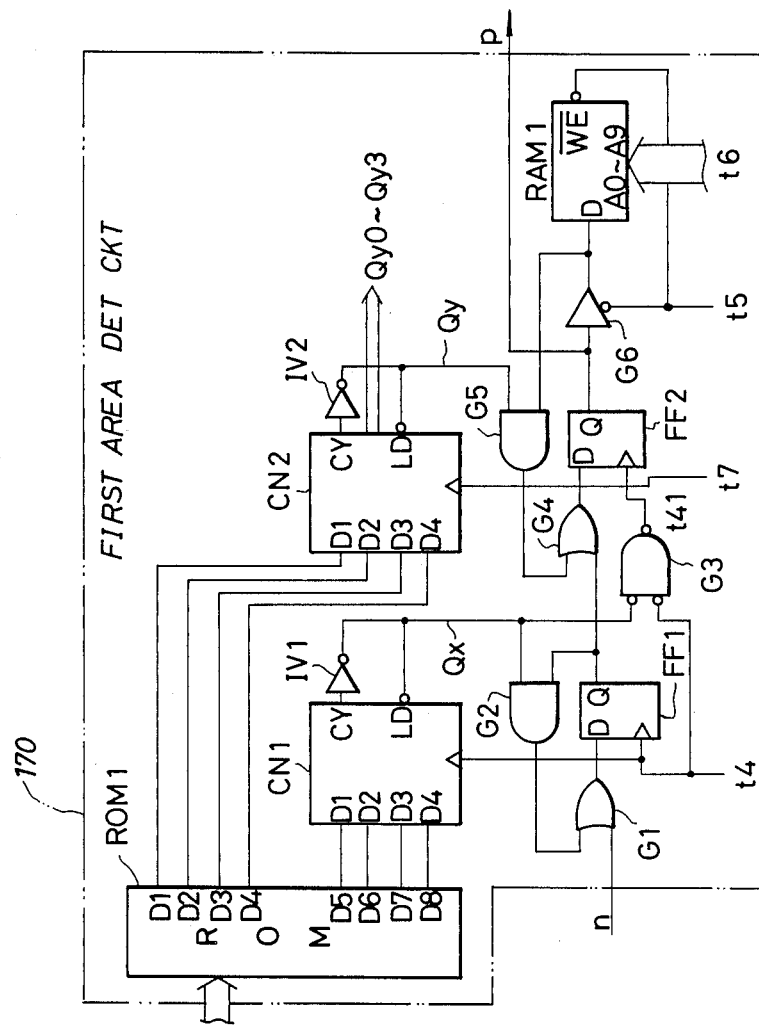

Referring then to FIG. 7c, the circuit 170 comprises read only memory ROM1, counters CN1 and CN2, flip-flops FF1 and FF2, random access memory RAM1, gates G1, G2, G3, G4, G5, G6 and inverters IV1 and IV2.

FIG. 12a shows the operation timing of the circuit 170 shown in FIG. 7c. The counter CN1 counts clock pulse t4 and counts-up on every picture element in the direction x. When the counted value of the counter CN1 reaches 15, the carry terminal CY of the counter CN1 goes to a high level H. Since an inverted signal of the high level signal of the terminal CY is applied to preset terminal LD of the counter CN1, the data at the input terminals D1-D4 are set to the counter when the next clock pulse appears. In FIG. 12a, the preset data is 8.

Accordingly, the counter CN1 operates as a step-by N counter that counts up on every arrival of the clock pulse t4. The value for N can optionally be set within a range from 1 to 16 depending on the value applied to the data input terminals D1-D4. A signal that takes a low level on every arrival of N shots of the clock pulses t4 during one period thereof appears at the signal line Qx.

While on the other hand, the signal n outputted on every picture element in the direction x is applied by way of the OR gate G1 to the flip-flop FF1 and latched in the flip-flop FF1 synchronized with t4. If the signal lien Qx is at a high level H, the signal latched to the flip-flop FF1 is applied from the output terminal Q by way of the AND gate G2 to one of the input terminals of the OR gate G1.

Accordingly, if the signal n is once turned to "1", the output terminal Q of the flip-flop FF1 maintains the state of "1" (H) till the signal line Qx goes to the low level L. That is, in the case where the counter CN1 is set as a step-by 8 counter, after the signal n for a certain first picture element has appeared at the terminal Q of the flip-flop FF1, as signal 01, the logical sum of the signal 01 and the next signal n appears on the terminal Q of the flip-flop FF2 as signal 02 and such processings are repeated similarly, whereby the result of the operation for all of the logic sums of each of the signals n for 8 picture elements continuous in the direction x, that is, signal 07 is obtained at the terminal Q of the flip-flop FF1 when the signal line Qx takes the low level.

Upon arrival of the next clock pulse t4, during the presence of the signal 07, the signal is latched to the flip-flop FF2 and the latched signal is outputted as the signal p. Further, the signal outputted from the flip-flop FF2 is stored in the random access memory RAM1 synchronized with clock pulse t5. Signal t6 designating the address in the memory RAM1 is updated to a value corresponding to the position in the direction x on every N picture elements in the direction x. The signal t6 has no concerns with the position of the picture element in the direction y. Accordingly, one line of data in the direction x is stored in the memory RAM1.

Further, at the timing of the clock pulse t41, the data stored in the previous line ($-1$ position on the relative coordinate in the direction y) in the memory RAM1 are read out, and applied by way of the AND gate G5 to one of the input terminals of the OR gate G4.

While on the other hand, the counter CN2 operates as a step-by N counter that counts up on every arrival of clock pulse t7. The clock pulse t7 is a sub-scanning sync pulse outputted on every change of the picture element position in the direction y. Other operations are the same as those in the case of the counter CN1.

Accordingly, signal line Qy usually remains at high level H and turns to a low level L at a ratio once per N picture elements among the elements in the direction y. If the high level H is applied, even once, to the data terminal D of the flip-flop FF2 during which signal line Qy remains high, since the logic sum between the high level signal and the input signal is held at the flip-flop FF1 and the memory RAM1, the signal p takes the high level H.

When the signal line Qy turns to the low level L, the result of the operation for all of the logical sum to the signals (for example 07) outputted from the flip-flop FF1 regarding the region for N picture elements continuous in the direction y (N line) is outputted as the signal p. That is, with respect to a predetermined picture element matrix comprising the arrangement of $N \times N$ (for example, $8 \times 8$), that is, each of the first areas, if even one picture element, which corresponds to the signal $n = 1$, is present in the picture elements, the signal p goes to "1" or the signal p goes to "0" in other cases. The signal p from the first area detection circuit, indicates the absence or presence of the dot, that is, the absence or presence of mesh points.

Data terminals D1–D4 of the counter CN1 are connected with the data terminals D5–D8 of the read only memory ROM1, whereas the data terminals D1–D4 of the counter CN2 are connected with the data terminals D1–D4 of the memory ROM1. A copy magnification ratio signal is applied to the address terminal of the memory ROM1. The read only memory ROM1 previously stores the information with a size for the first area corresponded to each of the copy magnification ratios.

For example, since the size of the first area is set to $8 \times 8$ picture elements, when the copy magnification ratio is 1.0 in this embodiment, 8 is outputted to the 4 bit output terminals D1–D4 of the first group of ROM1, while 8 is also outputted to the second group of 4 bit output terminals D5–D8. In this case, since the counters CN1 and CN2 are set with 8 upon presetting and they count as: 8, 9, 10, 11, 12, 13, 14, 15, 8, 9, 10, ... they operate as the step-by 8 counter. If the copy magnification ratio is different, the counting range for the counters CN1 and CN2 are changed, by which the size of the first area (number of picture elements) is changed.

In the second area detection circuit 180 shown in FIG. 7d, a second area composed of four first areas, that is, two first areas continuous with each other in the direction x and two first areas continuous with each other in the direction y is assumed, and it is determined whether three or more first areas in which the dots have been detected (signal p at 1) are present or not in this second area. If there are three or more first areas in which the dots are detected, the signal q is set to 1 indicating that the mesh point has been detected at a first area in the second area.

The second area detection is used to prevent the following erroneous detection. If there is depletion of dots caused on the side of the original due erroneous printing or the like, or erroneous dot detection caused on the side of the copying machine due to erroneous reading, those portions where mesh points are actually present may possibly be judged as with no such mesh points at the stage of the signal p. Further, a portion of a letter or contamination in the background may possibly be detected as one dot, which may possibly be judged erroneously as the mesh point region at the stage of the signal p even if the image is not a mesh point image.

Figure 12B:
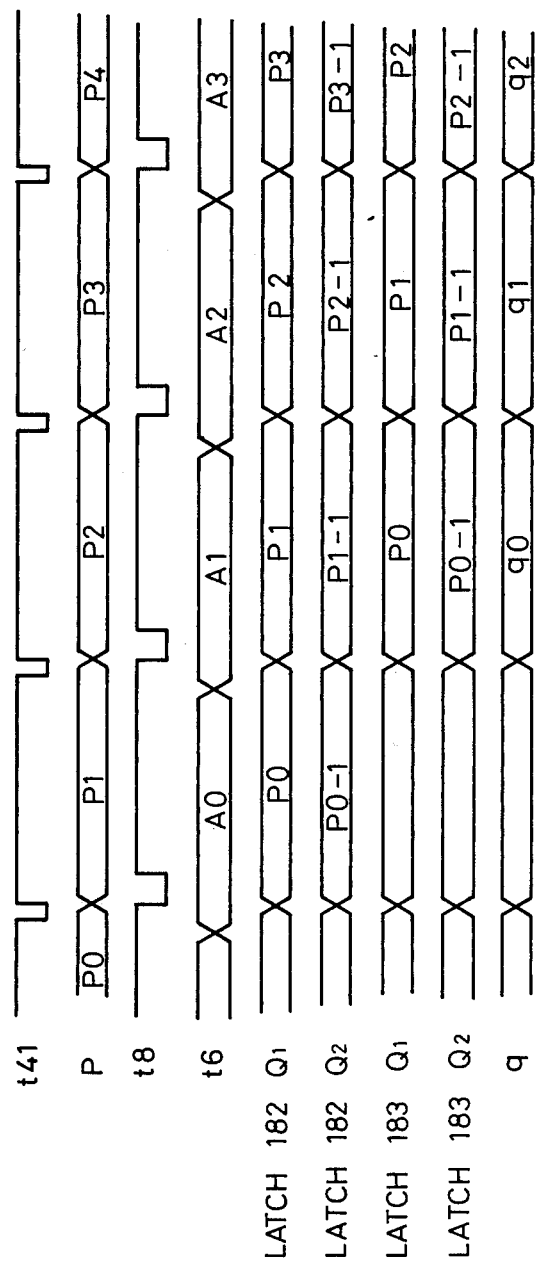

The operation timing of the second area detection circuit 180 is shown in FIG. 12b. Explanation will be made referring to FIG. 7d and FIG. 12b.

Data selector 181, latch 182 and random access memory 184 delay the signal p outputted on every first area in the direction y by the picture elements corresponding to the first area, in which signals of two adjacent first areas in the direction y are obtained at the same time at the output terminals Q1 and Q2 of the latch 182.

The latch 183 delays the signal outputted from the latch 182 in the direction x by the picture elements corresponding to the first area, in which signals prepared by delaying the signals appearing at Q1 and Q2 from the latch 182 in the direction x each by one first area are produced at the output terminals Q1 and Q2 of the latch 182. Accordingly, signals p corresponding to the respective four first areas contained in the second area are obtained at the same time at the output terminals Q1 and Q2 of the latch 182 and at the output terminals Q1 and Q2 of the latch 183.

That is, the signals p for the first areas E1, E2, E3 and E4 in FIG. 11 are obtained respectively at latches 183-Q1, 182-Q1, 183-Q2 and 182-Q2. These four signals are supplied to the gates G11, G12, G13, G14 and G15 to form signal q. If three or more of the four signals are "1" the signal q is "1". For instance, if three or more signals p are "1" in E1, E2, E3 and E4 in FIG. 11, the signal q corresponding to the first area E4 is "1".

In FIG. 12b, p0, p1, p3, p4 . . . indicate the signal p outputted on each first areas, q0, q1, . . . indicate the signal q outputted on each first area and p0-1, p1-1, p2-1, . . . indicate respectively those signals prepared by delaying p0, p1, p2, . . . in the direction y by the number of picture elements in one first area. For example, q1 is determined by four signals of p1-1, p1, p2-1 and p2.

In the third area detection circuit 190, four first areas continuous in the direction x are assumed as the third area as shown in FIG. 11 and, if at least one of the third areas contain a mesh point, the third area is judged to be a mesh point region and the signal r is set to "1".

The third area detection is used to counter moire fringes. That is, the risk of occurrence of moire fringes is much greater in the main scanning direction as compared with the sub-scanning direction in view of the scanning method and the structural reason. The moire fringes are almost not found at all in the sub-scanning direction. In the main scanning direction, moire fringes at a pitch of about 1 to 3 mm generally result when the resolution upon reading is 16 picture element/mm depending on the mesh point pitch or the relative angle between the original document and the scanning. If the amplitude of the read signal is reduced due to the moire fringes, the accuracy of dot detection is lowered thereby possibly causing an error in the dot detection. Accordingly, the detection for the third area is unnecessary in the case where there is no risk of moire fringes.

In this embodiment, since the number of picture elements in the direction x is 32 and the resolution for reading in the direction x is 16 picture elements/mm, the pitch in the third region is 2 mm.

Referring to FIG. 7d, third area detection circuit 190 comprises shift register 191 and OR gate 192. The shift register 192 shifts the signal q on every number of picture elements in the direction x in the first area synchronized with clock pulse t41.

When the signal q turns "1" by more than once in the four first areas continuous in the direction x, the signal r is set to "1" to all of the first areas constituting the third area containing the first area. That is, in FIG. 11, when the signal q turns "1" in the first area E1 of the third area, the signal r turns "1" also to other first areas E2, E5 and E6 constituting the third area.

Figure 13:
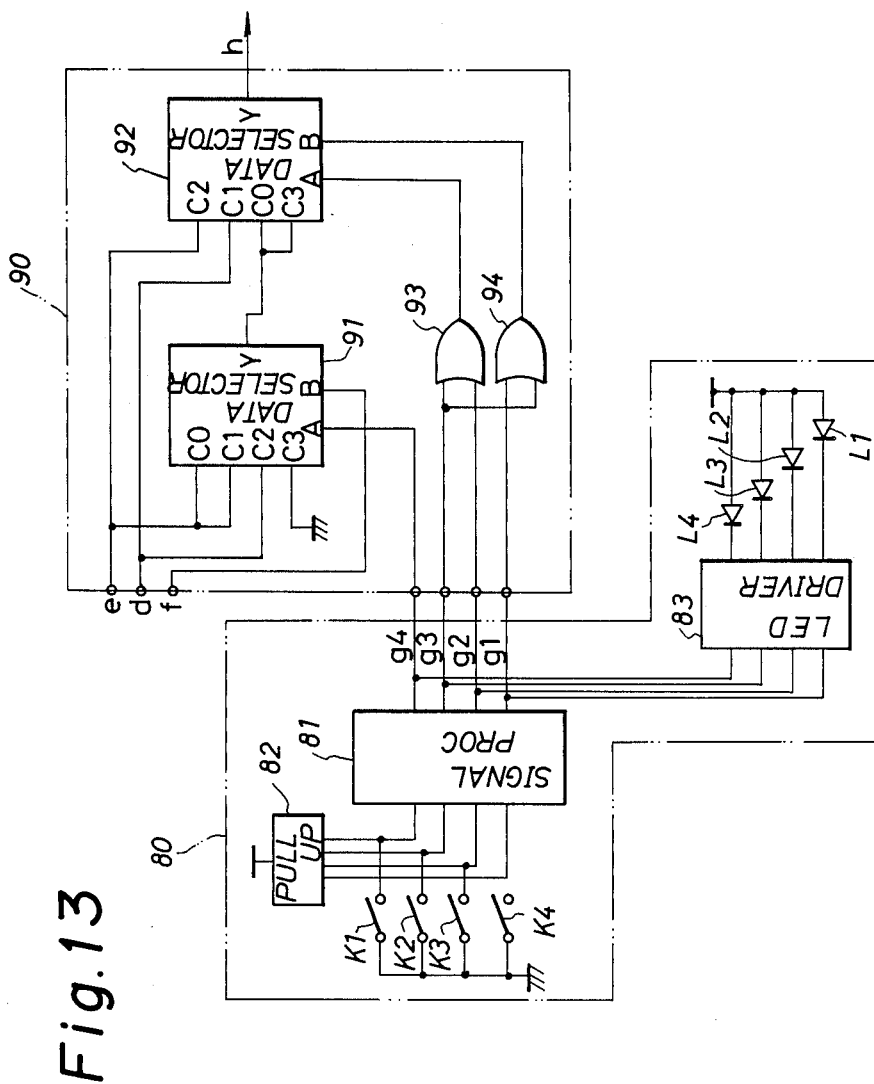
FIG. 13 is an electric circuit diagram of an operation control section 80 and an output control section 90.

Then, as shown in FIG. 13, operation control section 80 comprises mode keys K1, K2, K3 and K4, signal processing circuit 81 and pull-up circuit (resistor) 82, display driver 83, display lamps L1, L2, L3 and L4. The signal processing circuit 81 reads the states of the mode keys K1–K4 to output mode signals g1, g2, g3 and g4. When the mode key K1 is turned ON, each of the mode signals g1, g2, g3 and g4 respectively take 1, 0, 0 and 0. When the mode key K2 is turned ON, the mode signals g1, g2, g3 and g4 respectively take 0, 1, 0 and 0. When the mode key K3 is turned ON, the mode signals g1, g2, g3 and g4 respectively take 0, 0, 1 and 0. When the mode key K4 is turned ON, the mode signals g1, g2, g3 and g4 respectively take 0, 0, 0 and 1. In the case where none of the mode keys is depressed, each of the mode signals maintains the previous state. In the initial state, the mode signals g1, g2, g3 and g4 respectively take 1, 0, 0 and 0.

The display driver 83 drives the display lamps L1, L2, L3 and L4 depending on the state of the mode signals. That is, the display lamp L1 is actuated when the mode signals g1, g2, g3 and g4 respectively take 1, 0, 0 and 0, the display lamp L2 is actuated when the mode signals respectively take 0, 1, 0 and 0, the display lamp L3 is actuated when the mode signals respectively take 0, 0, 1 and 0, and the display lamp L4 is actuated when the mode signals respectively take 0, 0, 0 and 1.

The mode signals g1, g2, g3 and g4 outputted from the operation control section 80 are applied to the output control section 90.

As shown in FIG. 13, the output control section 90 comprises data selectors 91 and 92 and OR gates 93 and 94. The data selectors 91 and 92 select the input terminal C0 when the selection control terminals A and B are at 0, 0, select the input terminal C2 when the selection control terminals A and B at 1, 0 and select the input terminal C3 when the selection control terminals A and B are at 1, 1, and they output the signals applied to the selected input terminals to the output terminal Y. Signal e, signal e, signal d and a fixed level L (0) are applied respectively to the input terminals C0, C1, C2 and C3 of the data selector 91. Signals e and signal d are applied to the input terminals C1 and C2 of the data selector 92 respectively, and signals selected by the data selector 91 are applied to the input terminals C0 and C3 of the data selector 92. Accordingly, the contents of the signal h outputted from the output control section 90 are as shown in the following Table 1.

TABLE 1

| Operation mode | Type of original image | |
|---|---|---|
| | Intermediate tone image (f = 1) | Binary image (f = 0) |
| 1 | Indentical with signal e | Identical with signal e |
| 2 | Identical with signal d | Identical with signal d |
| 3 | Identical with signal d | Identical with signal e |
| 4 | Low level L | Identical with signal e |

In the table, the operation modes 1, 2, 3 and 4 are, respectively, letter mode (g1, g2, g3, g4=1, 0, 0, 0), photograph mode (g1, g2, g3, g4=0, 1, 0, 0), automatic separation mode (g1, g2, g3, g4=0, 0, 1, 0) and magic erase mode (g1, g2, g3, g4=0, 0, 0, 1).

When the letter mode is designated by depressing the mode key K1, signal e, prepared by simply binarizing the image data with the fixed threshold value TH1, is sent as the image data to the printer irrespective of the original image whether it is at an intermediate tone or not. While on the other hand, when the photograph mode is designated by depressing the mode key K2, a binary signal d, prepared from the image data by applying intermediate tone processing by means of the submatrix method, is supplied as the image data to the printer irrespective of the original image whether it is at the intermediate tone or not.

Further, when the automatic separation mode is designated by depressing the mode key K3, an image signal is selected depending on the result of a determination whether or not the original image contains the intermediate tone information. The signal f and the signal d after being subjected to intermediate tone processing are selected for the intermediate tone image and supplied to the printer, while the signal e after being subjected to simple binarization is selected and outputted to the printer 2 for the binary image. In this case, i is judged, for the mesh point printed image as it contains the intermediate tone information as described above and subjected to intermediate tone processing if it is a letter or the like.

When the magic erase mode is designated by depressing the mode key K4, a signal is selected depending on the result of the discrimination as to whether or not the original image contains intermediate tone information. Signal f, and a signal at a low level L, that is, a signal for the white picture element level is selected and outputted to the printer if it contains intermediate tone information, while a signal e subjected to simple binarization is selected and outputted to the printer 2 if it contains no intermediate tone information.

The operation of the magic erase mode will now be explained simply.

In the magic erase mode, all of the picture elements are replaced by signals corresponding to white picture elements (low level L) in the region judged to contain the intermediate tone information and outputted to the printer. That is, all of the images in the intermediate tone region are erased. Signals subjected to simple binarization in the region judged to contain no intermediate tone information are outputted to the printer.

Figures 14A, 14B:
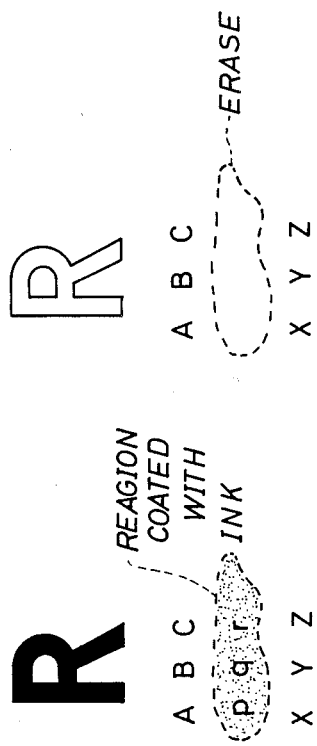

In the actual copy operation, the following is accomplished in the magic erase mode. As an original document having an image is shown in FIG. 14a, as containing a row of letters "ABC", "pqr", "XYZ" and a letter "R" written by fat lines. For instance, if it is intended to erase the portion of the letter "pqr", it can be attained by merely coating out the region with ink of a felt pen or the like at a relatively low density. Although the letter "pqr" is a binary image. if it is coated out, the space between the lines of the letter "pqr" is pigmented and all of the regions are regarded as one relatively large intermediate tone region. This can be discriminated by the section 71 of the section 70. That is, in the section 71, if the whole region with a size (7×7 picture elements matrix) larger than the predetermined size as described above has a density greater than the threshold value TH2, that region is regarded as the intermediate tone region.

For the region regarded as the intermediate tone region, since white picture elements are recorded (black picture elements are not recorded) irrespective of the contents of the original image (letter "pqr" in this case) and the density thereof, the letter "pqr" and marking used for coating out them are erased. In this case, other letters "ABC" and "XYZ" are processed as binary images and appear on the copy image (refer to FIG. 14b).

While on the other hand, for the letter "R" written with fat lines, other portions than the contour are erased in the magic erase mode without applying particular treatment such as coating out the spaces. Since a region greater than a predetermined size is discriminated as the intermediate tone region, the portion written with the fat lines is regarded as the intermediate tone region and erased as described above. However, the portion for the fat line contour, that is, a portion having the width from each of the picture elements situated at the outermost side of the fat line to the 7th picture elements in the direction x or in the direction y in the group of the picture elements corresponding to the fat line is discriminated to be a binary region. For the portion discriminated to be the binary region, the result from the binarization with the threshold value TH1 is outputted as an image signal. In this way, only the portion of the contour of the line appears as black on the copy (refer to FIG. 14b). That is, in the magic erase mode, all of the letters written with the fat lines are converted into a so-called blanked letter (or pattern).

Further, also in the case of coating out the space with a felt pen or the like at low density as described above, the contour portion of the region is processed as the binary region. However, if the density is lower than the threshold level TH1, the result of the binarization is a white picture element. That is, the contour can also be erased by utilizing a writing tool or the like at a low density for the coating out.

Furthermore, in the case where there are letters or the like previously described, for example, by using a felt pen at low density, all of them are erased.

In this case, a feature of the blanked copy obtained in this example will be explained. The blanked copy obtained in this embodiment can be not only in the case of a letter but also in any of the cases such as symbols, lines, graphs and pictures so long as they are of a pattern with a fatness greater than a predetermined size. Further, in this embodiment, since the contour portion left after the blanking treatment is recorded by the binarized image signal and the width of the thus recorded contour portion is constant, a sharp copied image with no blurring can be obtained.

The methods of obtaining blanked copies have also been proposed so far. However, since they have been obtained by as the result of exclusive OR logic of a blurred image and a sharp image optically, electrically or logically, in these cases certain disadvantages are inevitable in the blanked patterns, such as generation of blurring, rounding of corners, widening of the image, fusing of fine portions, etc.

There has also been proposed a method of preparing two types of signals binarized from image signals with two high and low threshold levels and obtaining a result by the exclusive logic sum for them. However, there are certain disadvantages such as irregularity in the fatness of a line and widening lines of an image.

Furthermore, in the above-mentioned two prior processes, since the exclusive logical sum are utilized, the blanking treatment is conducted for all fine lines or letters, graphs or the like, and the lines become fat in the blanked image more so than those of the original. That is, the prior blanking method is nearer to the framing operation.

While on the other hand, in the above-mentioned embodiment, since the blanking is effected only to an image having a fatness of a predetermined size, the portion with thin lines requiring no blanking is recorded as per the original. Further, since the contour portion of the original image is left as the blanked copy, the size of the pattern does not change. Further, undesired phenomena such as blurring in the image or rounding at the corners of the pattern do not result. Furthermore, the fatness of the lines in the pattern obtained by the blanking can optionally be varied by changing the constitution of picture elements (number of picture elements) processed in the section 71.

Figure 15B:
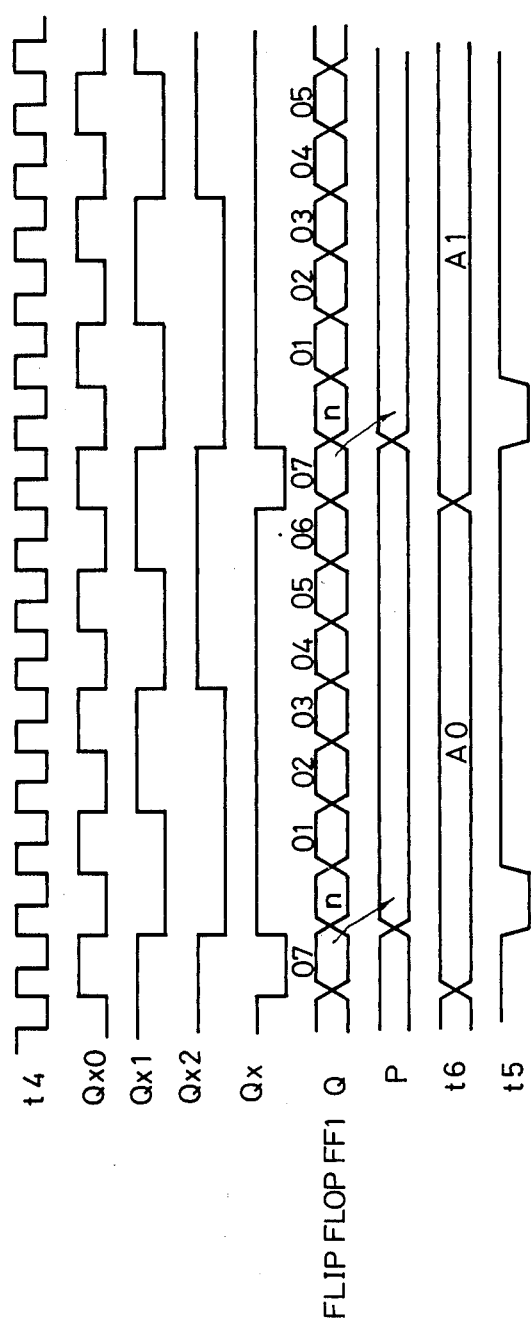

FIG. 15a shows a modified embodiment of the mesh detection circuit and the first area detection circuit and FIG. 15b shows the operation timing of the first area detection circuit 170B. Explanation will be made while referring to each of the figures. The mesh detection circuit 160B has the same constitution as the fourth mesh detection circuit MS4 as shown in FIG. 7b.

In the first area detection circuit 170B, the gate for generating the signal Qx is changed to gate 171 and the circuit for generating signal Qy is changed to gate 172. The three lower digit bits Qx0, Qx1 and Qx2 of a signal indicating the position of the picture element unit in the direction x are applied to the three input terminals of the gate 171 and the three lower digit bits Qy0, Qy1 and Qy2 of a signal indicating the position of the picture element unit in the direction y are applied to the three input terminals of the gate 172. Accordingly, the signal Qx turns to a low level L at a rate of 1 picture element for 8 picture elements continuous in the direction x and turns to a high level H in other periods. In the same manner, the signal Qy turns to the low level L at a rate of 1 picture element for 8 picture elements continuous in the direction y and turns to the high level H in other periods.

Accordingly, in this embodiment, the reference for the detection on the mesh detection circuit is fixed and the size of the first area is fixed to $8 \times 8$ picture elements.

Although, the above-mentioned embodiment is adapted such that the operation mode does not change unless the change is designated by the mode keys K1-K4, it may also be so adapted that the mode can be designated by the program optionally on every position for scanning the original document, for example, by using a ten key and the mode may be changed automatically by the control device on every scanning direction while conducting reading for the original.

Further, although this embodiment is adapted such that the portion discriminated to be an intermediate tone region is erased and the portion discriminated to be a binary image region is recorded in the magic erase mode, it may, conversely, be adapted such that only the portion discriminated to be the intermediate tone region is recorded. In this case, those signals subjected to simple binarization instead of the signals subjected to the intermediate tone treatment may be outputted in the portion discriminated to be the intermediate tone region. Thus, those portions coated out with a felt pen or the like do not appear on the copy. Thus, only the coated out portions can selectively be copied. This change can be made by merely altering the connection between each of the input terminals of the data selector 91 and each of the signal lines shown in FIG. 13.

As has been described above according to this invention, since each of the regions in the original image is discriminated if it is an intermediate tone image or not and the processing is automatically switched between that for the intermediate tone and for the binarization, even an original document in which intermediate tone images such as photographs and binary images such as letters are present together can be processed such that both of the images for the photograph and the letter can be copied clearly. Particularly, since the absence or presence of the mesh point image is detected and the intermediate tone processing is carried out for the mesh point image, occurrence of moire fringes can be prevented.

In addition, since the contents of the processing made by the circuit for discriminating the absence or presence of the intermediate tone information is changed in accordance with the copying magnification ratio, erroneous discrimination is decreased even in the case of varying the copy magnification ratio.

What is claimed is:

1. A digital copying apparatus comprising:
   a first means for scanning and reading an original image and producing electric signals each of which has a magnitude in accordance with an image density of a corresponding picture element of said original image;
   a second means for receiving said electric signals from the first means and producing binary coded signals in accordance with the magnitude of said electric signals;
   a third means for receiving said electric signals from the first means and producing bi-level signals by comparing the magnitudes of said electric signals with a first threshold value;
   a fourth means for receiving said electric signals from the first means, comparing the magnitudes of said electric signals with a second threshold value and transmitting a first signal indicative of an area comprising a predetermined number of adjacent picture elements and determined to be a continuous tone area depending on the result of the comparison;
   a fifth means for receiving said electric signals from the first means, comparing the magnitudes of said electric signals corresponding to picture elements which form a predetermined pattern in an area comprising a predetermined number of adjacent picture elements with a third threshold value and transitting second signals each of which is indicative of the area being a dot matrix area depending on the result of the comparison;
   a sixth means for receiving the second signals from the fifth means, comparing a number of said second signals received from the fifth means with a predetermined number, said second signals being within a first area comprising a predetermined number of adjacent second areas each comprising a predetermined number of adjacent picture elements, and transmitting a third signal indicative of one of the second areas at a predetermined position in the first area being regarded as continuous tone area depending on a result of the comparison; and
   a seventh means for recording the original image according to the binary coded signal from the second means on receiving at least one of said first and third signals and recording the original image according to bi-level signals from the third means on receiving none of said first and third signals.

2. The apparatus of claim 1, in which the fourth means is adapted to transmit the first signal when the magnitude of each of said electric signals corresponding to the adjacent picture elements is larger than the second threshold value.

3. The apparatus of claim 1, in which the first area comprises the predetermined number of second areas continuously disposed in a main scanning direction and a sub-scanning direction of the first means.

4. A digital copying apparatus comprising:
   a first means for scanning and reading an original image and producing electric signals each of which has a magnitude in accordance with an image density of a corresponding picture element of said original image;
   a second means for receiving said electric signals from the first means and producing binary coded signals in accordance with the magnitudes of said electric signals;
   a third means for receiving said electric signals from the first means and producing bi-level signals by comparing magnitudes of said electric signals with a first threshold value;
   a fourth means for receiving said electric signals from the first means, comparing the magnitudes of said electric signals with a second threshold value and transmitting a first signal indicative of an area comprising adjacent picture elements, the number of which is set in accordance with a magnification of the copying apparatus and determined to be a continuous tone area depending on the result of the comparison;

a fifth means for receiving said electric signals from the first means, comparing the magnitude of said electric signals corresponding to picture elements which form a pattern set in accordance with the magnification in an area comprising a predetermined number of adjacent picture elements with a third threshold value and transmitting second signals each of which is indicative of the area being a dot matrix area depending on the result of the comparison;

a sixth means for receiving the second signals from the fifth means, comparing a number of said second signals received from the fifth means with a predetermined number, said second signals being within a first area comprising a predetermined number of adjacent second areas, each comprising a predetermined number of adjacent picture elements, and transmitting a third signal indicative of one of the second areas at a predetermined position in the first area being regarded as a continuous tone area depending on the result of the comparison; and a seventh means for recording the original image according to the binary coded signals from the second means on receiving at least one of said first and third signals and recording the original image according to bi-level signals from the third means on receiving none of said first and third signals.

5. The apparatus of claim 4, in which the fourth means is adapted to transmit the first signal when the magnitude of each of said electric signals corresponding to the adjacent picture elements is larger than the second threshold value.

6. The apparatus of claim 4, in which the first area comprises the predetermined number of second areas continuously disposed in a main scanning direction and a sub-scanning direction of the first means.

7. A digital copying apparatus comprising:
a first means for scanning and reading an original image and producing electric signals each of which has a magnitude in accordance with an image density of a corresponding picture element of said original image;

a second means for receiving said electric signals from the first means and producing binary coded signals in accordance with the magnitudes of said electric signals;

a third means for receiving said electric signals from the first means and producing bi-level signals by comparing magnitudes of said electric signals with a first threshold value;

a fourth means for receiving said electric signals from the first means, comparing the magnitudes of said electric signals with a second threshold value and transmitting a first signal indicative of an area comprising a predetermined number of adjacent picture elements and determined to be a continuous tone area depending on the result of the comparison;

a fifth means for receiving said electric signals from the first means, comparing the magnitudes of said electric signals corresponding to picture elements which form a predetermined pattern in an area comprising a predetermined number of adjacent picture elements, with a third threshold value and transmitting second signals each of which is indicative of the area being a dot matrix area depending on the result of the comparison;

a sixth means for receiving the second signal from the fifth means, comparing a number of said second signals received from the fifth means with a predetermined number, said second signals being within a first area comprising a predetermined number of adjacent second areas each comprising a predetermined number of adjacent picture elements, and transmitting said third signals each of which is indicative of one of the second areas at a predetermined position in the first area regarded as a continuous tone area depending on the result of the comparison;

a seventh means for receiving the third signals from the sixth means, comparing a number of the third signals received from the sixth means with a predetermined number, said third signals being within a third area comprising a predetermined number of adjacent second areas and transmitting a fourth signal indicative of each second area in the third area being regarded as a continuous tone area depending on the result of the comparison; and an eighth means for recording the original image according to the binary coded signals form the second means on receiving at least one of said first and fourth signals and recording the original image according to bi-level signals from the third means on receiving none of said first and fourth signals.

8. The apparatus of claim 7, in which the fourth means is adapted to transmit the first signal when the magnitude of each of said electric signals corresponding to the adjacent picture elements is larger than the second threshold value.

9. The apparatus of claim 7, in which the first area comprises the predetermined number of the second area continuously disposed in a main scanning direction and a subscanning direction of the first means.

10. The apparatus of claim 7, in which the third area comprises the predetermined number of the second areas continuously disposed in the main scanning direction.

* * * * *